US012772126B2

(12) United States Patent
Schliwa-Bertling et al.

(10) Patent No.: US 12,772,126 B2
(45) Date of Patent: Oct. 20, 2026

(54) SYSTEM AND METHOD FOR STEERING A WIRELESS DEVICE TO A NETWORK SLICE

(71) Applicant: Telefonaktiebolaget LM Ericsson (publ), Stockholm (SE)

(72) Inventors: Paul Schliwa-Bertling, Ljungsbro (SE); Ylva Timner, Luleå (SE); Angelo Centonza, Torrenueva Costa Granada (ES); Peter Hedman, Helsingborg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 499 days.

(21) Appl. No.: 18/006,914

(22) PCT Filed: Aug. 13, 2021

(86) PCT No.: PCT/IB2021/057496
§ 371 (c)(1),
(2) Date: Jan. 26, 2023

(87) PCT Pub. No.: WO2022/034554
PCT Pub. Date: Feb. 17, 2022

(65) Prior Publication Data
US 2023/0269640 A1 Aug. 24, 2023

Related U.S. Application Data

(60) Provisional application No. 63/065,235, filed on Aug. 13, 2020.

(51) Int. Cl.
*H04W 36/08* (2009.01)
*H04W 36/00* (2009.01)

(52) U.S. Cl.
CPC ....... *H04W 36/08* (2013.01); *H04W 36/0016* (2013.01); *H04W 36/0072* (2013.01)

(58) Field of Classification Search
CPC ............. H04W 36/08; H04W 36/0016; H04W 36/0072; H04W 36/385; H04W 36/26
(Continued)

(56) References Cited

U.S. PATENT DOCUMENTS

2006/0023664 A1* 2/2006 Jeong ................ H04W 36/0007 370/329
2021/0022024 A1* 1/2021 Yao ....................... H04W 24/08
(Continued)

FOREIGN PATENT DOCUMENTS

CN 111133801 A 5/2020
CN 111416730 A 7/2020

OTHER PUBLICATIONS

3GPP TR 23.700-40 V0.4.0 (Jun. 2020): Technical Report: 3rd Generation Partnership Project, "Technical Specification Group Services and System Aspects; Study on enhancement of network slicing; Phase 2," (Release 17) (Year: 2020).*
(Continued)

*Primary Examiner* — Nicholas A Jensen
*Assistant Examiner* — Oladiran Gideon Olaleye
(74) *Attorney, Agent, or Firm* — Weisberg I.P. Law, P.A.

(57) ABSTRACT

In one embodiment, a method performed by a network node for cell selection to access a network slice on a different frequency than a wireless device, WD, is currently served by is provided. The method includes receiving a service request from the WD, the WD being connected to a first cell, the first cell servicing a first network slice which operates in a first frequency, the requested service to be performed over a second network slice which operates in a second frequency; obtaining policy information relating to the first and the second network slices; determining which one of the first cell and a second cell to perform the requested service based at least in part on the obtained policy information; and
(Continued)

providing a session for the WD to receive the requested service over the determined one of the first cell and the second cell.

16 Claims, 12 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2022/0159772 | A1* | 5/2022 | Raghavan | H04L 5/0094 |
| 2022/0201601 | A1* | 6/2022 | Cai | H04W 8/20 |
| 2022/0330212 | A1* | 10/2022 | Klatt | H04L 5/14 |
| 2022/0417101 | A1* | 12/2022 | Ding | H04L 43/20 |

OTHER PUBLICATIONS

International Search Report and Written Opinion dated Nov. 18, 2021 issued in PCT Application No. PCT/IB2021/057496 filed Aug. 13, 2021, consisting of 15 pages.

SA WG2 Meeting #139E S2-2003733 (revision of S2-200xxxx); Source: Apple; Title: KI #7, New Sol: AMF Assistance lo NG-RAN During PDU Session Establishment Procedure; Document for: Approval; Agenda Item: 8.4; Work Item/Release: FS_eNS_Ph2/Rel-17, Jun. 1-12, 2020, Elbonia, consisting of 3 pages.

3GPP TSG-RAN WG3 #109e Tdoc R3-205031; Source: Ericsson; Title: Reasons ad Methods for Serving Slices on Different Frequencies; Agenda Item: 17.3; Document for: Discussion, Decision; Electronic Meeting Aug. 17-28, 2020, consisting of 9 pages.

3GPP TSG-RAN WG3 Meeting #100 R3-183063; Source: LG Electronics Inc.; Title: Consideration on Allowed NSSAI in NG-RAN; Agenda Item: 10.2.1.2; Document for: Discussion and Approval, May 21-25, 2018, Busan, Korea, consisting of 7 pages.

3GPP TR 23.700-40 V0.4.0 (Jun. 2020) 3rd Generation Partnership Project; Technical Specification Group Services and System Aspects; Study on enhancement of network slicing; Phase 2 (Release 17), consisting of 143 pages.

3GPP TS 23.501 V16.5.0 (Jul. 2020) 3rd Generation Partnership Project; Technical Specification Group Services and System Aspects; System architecture for the 5G System (5GS); Stage 2 (Release 16), consisting of 441 pages.

3GPP TS 38.401 V16.2.0 (Jul. 2020) 3rd Generation Partnership Project; Technical Specification Group Radio Access Network; NG-RAN; Architecture description (Release 16), consisting of 77 pages.

Chinese Office Action and summary English translation of the Chinese Office Action dated Jul. 3, 2025 issued in corresponding Chinese Application No. 202180055887.2, consisting of 9 pages.

3GPP TSG-SA WG2 Meeting #139E S2-2003629; Source: NEC; Title: KI#7 New Sol#X: Steering the UE to a network slice in a different frequency band; Agenda Item: 8.4; Work Item / Release: FS_eNS_Ph2 / Rel-17; Document for: Approval; Jun. 1-12, 2020, Electronic, Elbonia, consisting of 3 pages.

* cited by examiner

SYSTEM AND METHOD FOR STEERING A WIRELESS DEVICE TO A NETWORK SLICE

CROSS-REFERENCE TO RELATED APPLICATIONS

This application is a Submission Under 35 U.S.C. § 371 for U.S. National Stage Patent Application of International Application No.: PCT/IB2021/057496, filed Aug. 13, 2021 entitled "SYSTEM AND METHOD FOR STEERING A WIRELESS DEVICE TO A NETWORK SLICE," which claims priority to U.S. Provisional Application No. 63/065,235, filed Aug. 13, 2020, entitled "SYSTEM AND METHOD FOR STEERING A USER EQUIPMENT TO A NETWORK SLICE," the entireties of both of which are incorporated herein by reference.

TECHNICAL FIELD

The present disclosure relates to wireless communication and in particular, to a system and method for steering a wireless device to a network slice.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The current 3$^{rd}$ Generation Partnership Project (3GPP) 5$^{th}$ Generation (5G, also called New Radio or NR) RAN architecture is described in 3GPP Technical Specification (TS) 38.401 as shown in FIG. 1.

The Next Generation (NG) architecture can be further described as follows:

- The NG-RAN includes a set of eNBs and gNBs connected to the 5G core (5GC) through the NG.
- An eNB/gNB can support frequency division duplex (FDD) mode, time division duplex (TDD) mode or dual mode operation.
- eNB/gNBs can be interconnected through the Xn.
- A gNB may include a gNB control unit (gNB-CU) and gNB distributed units (gNB-DUs).
- A gNB-CU and a gNB-DU are connected via F1 logical interface.
- One gNB-DU is connected to only one gNB-CU.

NG, Xn and F1 are logical interfaces. For NG-RAN, the NG and Xn-C interfaces for a gNB includes a gNB-CU and gNB-DUs, terminate in the gNB-CU. For Evolved-Universal Terrestrial Radio Access-New Radio Dual Connectivity (EN-DC), the S1-U and X2-C interfaces for a gNB includes a gNB-CU and gNB-DUS, terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all access and management functions (AMFs) within an AMF Region. The AMF Region is defined in 3GPP TS 23.501.

Network Slicing

Network slicing is about creating logically separated partitions of the network, addressing different business purposes. These "network slices" are logically separated to a degree that they can be regarded and managed as networks of their own.

This is a new concept that potentially applies to both Long Term Evolution (LTE) Evolution and new 5G radio access technology (RAT) (NR). One key driver for introducing network slicing is business expansion, i.e., improving the cellular operator's ability to serve other industries, e.g., by offering connectivity services with different network characteristics (performance, security, robustness, and complexity).

The current working assumption is that there will be one shared Radio Access Network (RAN) infrastructure that will connect to several core network (CN) instances (with one or more Common Control network (NW) Functions, CCNF, interfacing the RAN, plus additional CN functions which may be slice-specific). As the CN functions are being virtualized, it is assumed that the operator will instantiate a new Core Network (CN), or part of it, when a new slice should be supported. An example of this architecture is shown in FIG. 2. Slice 0 can for example be a Mobile Broadband (MBB) slice and Slice 1 can for example be a Machine Type Communication (MTC) network slice.

3GPP is currently working on introduction of enhancements to the network slicing framework introduced to 3GPP 5G System (5GS). There currently exist certain challenges.

In many cases there is a desire to prioritize between services e.g., admission control for User Plane (UP) is done until there is an attempt to activate the UP i.e., just because the protocol data unit (PDU) Session is established it cannot be expected that the UP will always be successfully activated (i.e., dedicated radio bearers/DRBs setup on the Access Stratum/AS and path setup to UPFs in the 5GC) when requested. In the same way, it cannot be assumed that all Single Network Slice Selection Assistance Information (S-NSSAIs) in an Allowed NSSAI always can be used at the same time in all situations.

However, as a basic principle the S-NSSAIs in the Allowed NSSAI should allowed at the same time. That can be achieved by defining priorities between frequency bands (FBs) for a network slice e.g., as to achieve the Quality-of-Service (QoS) that is possible.

If there is a desire to completely isolate network slices between each other, then preferably the S-NSSAIs may be isolated from each other and should not be in the same Allowed NSSAI. However, this may create a problem that a UE would not be able to access the not allowed slices unless it connects to a cell belonging to the area within which the slices are supported.

This solution achieves the possibility to keep all S-NSSAIs in the Allowed NSSAI and, depending on the UP to be activated, the FB to be used is selected by the NG-RAN e.g., using AMF provided Radio Access Technology Frequency Selection Policy (RFSP) reflecting the current situation as input. In this case, if there is a strict definition (i.e., requirement) of which FBs network slices can have their UP activated on; then some UP may be deactivated (e.g., DRBs on AS released and paths to UPFs released) dependent upon which FB the UE will be using and which network slice the UE is requesting UP traffic for.

In this document, the term FB is equivalent to carrier frequency, radio frequency, cell frequency and in general it identifies the frequency range on which radio resources are available.

Each network slice has a preferred FB on which the UP should be setup, e.g., as certain FBs work best from a performance perspective. Note that if resources are available on non-preferred FBs then there may be no issue in serving a slice on a non-preferred FB as all UPs are maintained and can be correctly (in the same cases QoS may be reduced).

If the FB is strictly defined/required for some network slices, then in this solution at least the UP is deactivated for PDU Sessions not defined/supported for the FB at UP level.

If the FB is strictly defined/required for some network slices, then the UP is not activated if required FB cannot be used.

If the FB for network slices are preferences e.g., as certain FBs work best from a performance perspective then there may be no issue as from a UE perspective and the existing standard may be re-used.

If the FB is strictly defined/required for some network slices, then the UE will see that the UP for some PDU Sessions are not activated in a same or similar way as done today in cases of resource limitations conditions i.e., no impacts on the UE as such.

Certain aspects of the present disclosure and their embodiments may provide solutions to these or other challenges.

One aspect introduces support of 5GC assisted cell selection to access network slice.

Some embodiments of the present disclosure may address one or more of the following:

- How a 5GS steers UEs to a 5G access network (5G-AN) (e.g., a specific frequency band) that can support the network slices that the UE is able/allowed to use.
- What information does 5GS use to make a decision to steer the UE to a proper 5G-AN.

Some embodiments of the present disclosure are based on one or more of the following high level assumptions and principles. The UE is allocated Allowed NSSAI which are supported by all cells in the Registration area. However, some cells in the registration area will not serve the UP from some S-NSSAI's in the Allowed NSSAI. The UP for certain slices is served by specific frequency layers, i.e., by cells using resources in such frequency layers. Such policy may constitute a preference, i.e., certain slice's UP may also be served in non-preferred frequency layers, or a mandate, i.e., certain network slice's UP cannot be served unless on pre-determined frequency layers.

In some aspects, RAN controlled steering of a UE is dependent on used network slices with the 5GC input.

There are, proposed herein, various embodiments which address one or more of the issues disclosed herein.

Certain embodiments may provide one or more of the following technical advantages: introduces support of 5GC assisted cell selection to access network slice on a different frequency band than the UE currently camps on/is served by.

SUMMARY

According to one aspect of the present disclosure, a method performed by a network node for cell selection to access a network slice on a different frequency than a wireless device, WD, is currently served by is provided. The method comprises receiving a service request from the WD, the WD being connected to a first cell, the first cell servicing a first network slice which operates in a first frequency, the requested service to be performed over a second network slice which operates in a second frequency; obtaining policy information relating to the first and the second network slices; determining which one of the first cell and a second cell to perform the requested service based at least in part on the obtained policy information; and providing a session for the WD to receive the requested service over the determined one of the first cell and the second cell.

In some embodiments of this aspect, the determining which one of the first cell and the second cell to perform the requested service is based at least in part on frequency information related to the first and second network slices, the obtained policy information being based at least in part on the frequency information. In some embodiments of this aspect, the frequency information indicates at least one of:

a. whether the second frequency is required for the second network slice;

b. whether the second frequency for the second network slice is a preference; and c. whether the WD is not to be moved from the first cell to the second cell.

In some embodiments of this aspect, the frequency information indicates at least one of: a. whether the second frequency is required for an activated user plane, UP, in the second network slice; b. whether the second frequency for the activated UP in the second network slice is a preference; and c. whether the WD is not to be moved from the first cell to the second cell. In some embodiments of this aspect, the determining which one of the first cell and the second cell to perform the requested service comprises: when the policy information indicates that the second frequency is required for the second network slice, determining to initiate an inter-frequency cell change of the WD from the first cell operating on the first frequency to the second cell operating on the second frequency, the second cell servicing the second network slice and the second cell being in a location of the WD.

In some embodiments of this aspect, the determining which one of the first cell and the second cell to perform the requested service comprises: when the policy information indicates that the frequency for the second network slice is the preference, determining to at least one of: establish the session to perform the requested service on the first cell; and initiate an inter-frequency cell change of the WD from the first cell operating on the first frequency to the second cell operating on the second frequency, the second cell being preferred over the first cell for servicing the second network slice and the second cell being in a location of the WD.

In some embodiments of this aspect, the determining which one of the first cell and the second cell to perform the requested service comprises: when the policy information indicates that the WD is not to be moved from the first cell to the second cell, determining to utilize the first cell to perform the requested service over the second frequency by: adopting a user plane, UP, configuration to serve the second network slice; and establishing the session on the first cell, the first cell servicing the second network slice in the second frequency according to the adopted UP configuration. In some embodiments of this aspect, the first and second network slices are indicated in an allowed network slice selection assistance information, NSSAI, as allowed for the WD.

In some embodiments of this aspect, the policy information related to the first and second network slices is comprised in a radio access technology frequency selection policy, RESP, from a policy control function, PCF. In some embodiments of this aspect, the session is a protocol data unit, PDU, session.

According to an aspect of the present disclosure, a method performed by a network node for cell selection to access a network slice on a different frequency than a wireless device, WD, is currently served by is provided. The network node comprising an access and mobility function, AMF, and the method comprising: receiving a service request associated with the WD, the WD being connected to a first cell, the first cell servicing a first network slice which operates in a first frequency, the requested service to be performed over a second network slice which operates in a second frequency; and providing policy information relating to the first and the second network slices, (i) which one of the first cell and a second cell to perform the requested service and (ii) a session over which the requested service is provided to the WD being based at least in part on the provided policy information.

In some embodiments of this aspect, the one of the first cell and the second cell to perform the requested service is based at least in part on frequency information related to the first and second network slices, the provided policy information being based at least in part on the frequency information. In some embodiments of this aspect, the frequency information indicates at least one of: a. whether the second frequency is required for the second network slice; b. whether the second frequency for the second network slice is a preference; and c. whether the WD is not to be moved from the first cell to the second cell. In some embodiments of this aspect, the frequency information indicates at least one of: a. whether the second frequency is required for an activated user plane, UP, in the second network slice; b. whether the second frequency for the activated UP in the second network slice is a preference; and c. whether the WD is not to be moved from the first cell to the second cell.

In some embodiments of this aspect, when the policy information indicates that the second frequency is required for the second network slice, an inter-frequency cell change of the WD from the first cell operating on the first frequency to the second cell operating on the second frequency is initiated, the second cell servicing the second network slice and the second cell being in a location of the WD. In some embodiments of this aspect, when the policy information indicates that the frequency for the second network slice is the preference, at least one of: the session is established to perform the requested service on the first cell; and an inter-frequency cell change of the WD is initiated from the first cell operating on the first frequency to the second cell operating on the second frequency, the second cell being preferred over the first cell for servicing the second network slice and the second cell being in a location of the WD.

In some embodiments of this aspect, when the policy information indicates that the WD is not to be moved from the first cell to the second cell, the first cell is utilized to perform the requested service over the second frequency by: adoption of a user plane, UP, configuration at the first cell to serve the second network slice; and establishment of the session on the first cell, the first cell servicing the second network slice in the second frequency according to the adopted UP configuration. In some embodiments of this aspect, the first and second network slices are indicated in an allowed network slice selection assistance information, NSSAI, as allowed for the WD. In some embodiments of this aspect, the policy information related to the first and second network slices is comprised in a radio access technology frequency selection policy, RESP, from a policy control function, PCF. In some embodiments of this aspect, the method further includes updating the policy information to indicate activation of a user plane, UP, in the second network slice.

According to another aspect of the present disclosure, a network node for cell selection to access a network slice on a different frequency than a wireless device, WD, is currently served by is provided. The network node comprises processing circuitry. The processing circuitry is configured to cause the network node to receive a service request from the WD, the WD being connected to a first cell, the first cell servicing a first network slice which operates in a first frequency, the requested service to be performed over a second network slice which operates in a second frequency; obtain policy information relating to the first and the second network slices; determine which one of the first cell and a second cell to perform the requested service based at least in part on the obtained policy information; and provide a session for the WD to receive the requested service over the determined one of the first cell and the second cell.

In some embodiments of the present disclosure, the processing circuitry is configured to determine which one of the first cell and the second cell to perform the requested service based at least in part on frequency information related to the first and second network slices, the obtained policy information being based at least in part on the frequency information. In some embodiments of this aspect, the frequency information indicates at least one of: a. whether the second frequency is required for the second network slice; b. whether the second frequency for the second network slice is a preference; and c. whether the WD is not to be moved from the first cell to the second cell. In some embodiments of this aspect, the frequency information indicates at least one of: a. whether the second frequency is required for an activated user plane, UP, in the second network slice; b. whether the second frequency for the activated UP in the second network slice is a preference; and c. whether the WD is not to be moved from the first cell to the second cell.

In some embodiments of this aspect, the processing circuitry is configured to determine which one of the first cell and the second cell to perform the requested service by being configured to: when the policy information indicates that the second frequency is required for the second network slice, determine to initiate an inter-frequency cell change of the WD from the first cell operating on the first frequency to the second cell operating on the second frequency, the second cell servicing the second network slice and the second cell being in a location of the WD. In some embodiments of this aspect, the processing circuitry is configured to determine which one of the first cell and the second cell to perform the requested service by being configured to: when the policy information indicates that the frequency for the second network slice is the preference, determine to at least one of: establish the session to perform the requested service on the first cell; and initiate an inter-frequency cell change of the WD from the first cell operating on the first frequency to the second cell operating on the second frequency, the second cell being preferred over the first cell for servicing the second network slice and the second cell being in a location of the WD.

In some embodiments of this aspect, the processing circuitry is configured to determine which one of the first cell and the second cell to perform the requested service by being configured to: when the policy information indicates that the WD is not to be moved from the first cell to the second cell, determine to utilize the first cell to perform the requested service over the second frequency by: adopt a user plane, UP, configuration to serve the second network slice; and establish the session on the first cell, the first cell servicing the second network slice in the second frequency according to the adopted UP configuration. In some embodiments of this aspect, the first and second network slices are indicated in an allowed network slice selection assistance information, NSSAI, as allowed for the WD. In some embodiments of this aspect, the policy information related to the first and second network slices is comprised in a radio access technology frequency selection policy, RESP, from a policy control function, PCF. In some embodiments of this aspect, the session is a protocol data unit, PDU, session.

According to an aspect of the present disclosure, a network node for cell selection to access a network slice on a different frequency than a wireless device, WD, is currently served by is provided. The network node comprises an access and mobility function, AMF, and the network node comprises processing circuitry. The processing circuitry is configured to cause the network node to: receive a service request associated with the WD, the WD being connected to a first cell, the first cell servicing a first network slice which operates in a first frequency, the requested service to be performed over a second network slice which operates in a second frequency; and provide policy information relating to the first and the second network slices, (i) which one of the first cell and a second cell to perform the requested service and (ii) a session over which the requested service is provided to the WD being based at least in part on the provided policy information.

In some embodiments of this aspect, the one of the first cell and the second cell to perform the requested service is based at least in part on frequency information related to the first and second network slices, the provided policy information being based at least in part on the frequency information. In some embodiments of this aspect, the frequency information indicates at least one of: a. whether the second frequency is required for the second network slice; b. whether the second frequency for the second network slice is a preference; and c. whether the WD is not to be moved from the first cell to the second cell. In some embodiments of this aspect, the frequency information indicates at least one of: a. whether the second frequency is required for an activated user plane, UP, in the second network slice; b. whether the second frequency for the activated UP in the second network slice is a preference; and c. whether the WD is not to be moved from the first cell to the second cell.

In some embodiments of this aspect, when the policy information indicates that the second frequency is required for the second network slice, an inter-frequency cell change of the WD from the first cell operating on the first frequency to the second cell operating on the second frequency is initiated, the second cell servicing the second network slice and the second cell being in a location of the WD. In some embodiments of this aspect, when the policy information indicates that the frequency for the second network slice is the preference, at least one of: the session is established to perform the requested service on the first cell; and an inter-frequency cell change of the WD is initiated from the first cell operating on the first frequency to the second cell operating on the second frequency, the second cell being preferred over the first cell for servicing the second network slice and the second cell being in a location of the WD.

In some embodiments of this aspect, when the policy information indicates that the WD is not to be moved from the first cell to the second cell, the first cell is utilized to perform the requested service over the second frequency by: adoption of a user plane, UP, configuration at the first cell to serve the second network slice; and establishment of the session on the first cell, the first cell servicing the second network slice in the second frequency according to the adopted UP configuration. In some embodiments of this aspect, the first and second network slices are indicated in an allowed network slice selection assistance information, NSSAI, as allowed for the WD. In some embodiments of this aspect, the policy information related to the first and second network slices is comprised in a radio access technology frequency selection policy, RESP, from a policy control function, PCF. In some embodiments of this aspect, the processing circuitry is further configured to: update the policy information to indicate activation of a user plane, UP, in the second network slice.

According to another aspect of the present disclosure, a computer readable medium comprising computer instructions executable by at least one processing circuitry to perform any one or more of the methods above is provided.

According to another aspect of the present disclosure, a computer readable medium comprising computer instructions executable by at least one processing circuitry to perform any one or more of the methods above is provided.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
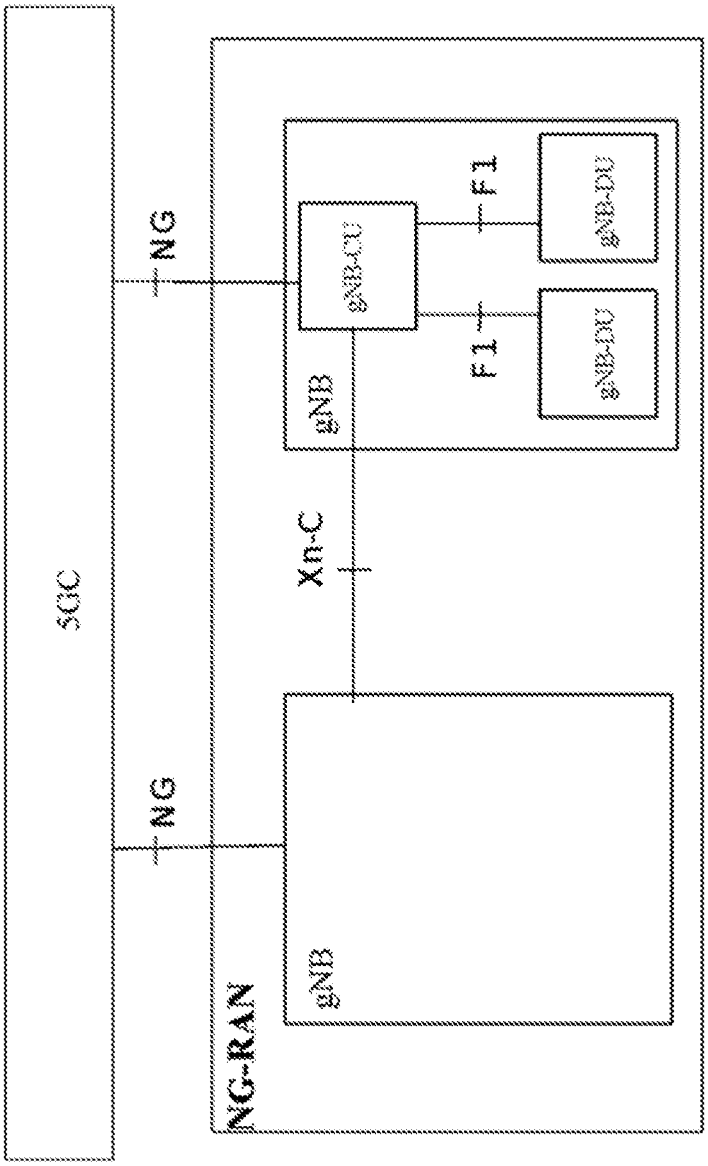
FIG. 1 illustrates an example NG architecture.
Figure 2:
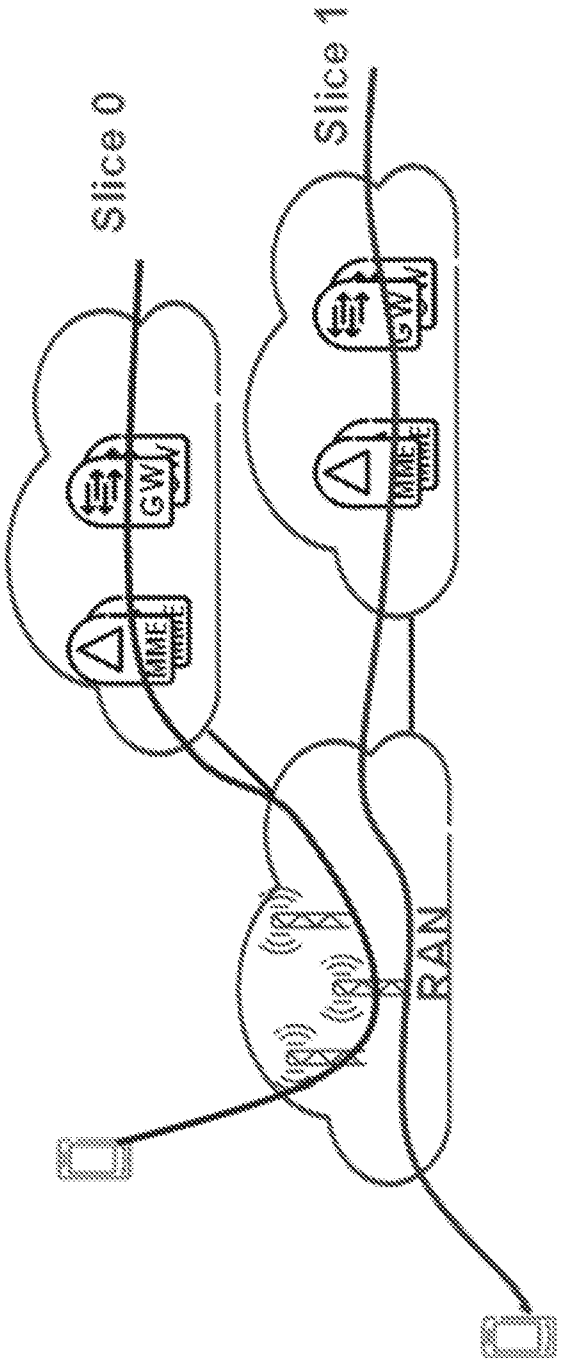
FIG. 2 illustrates an example network slicing concept.
Figure 3:
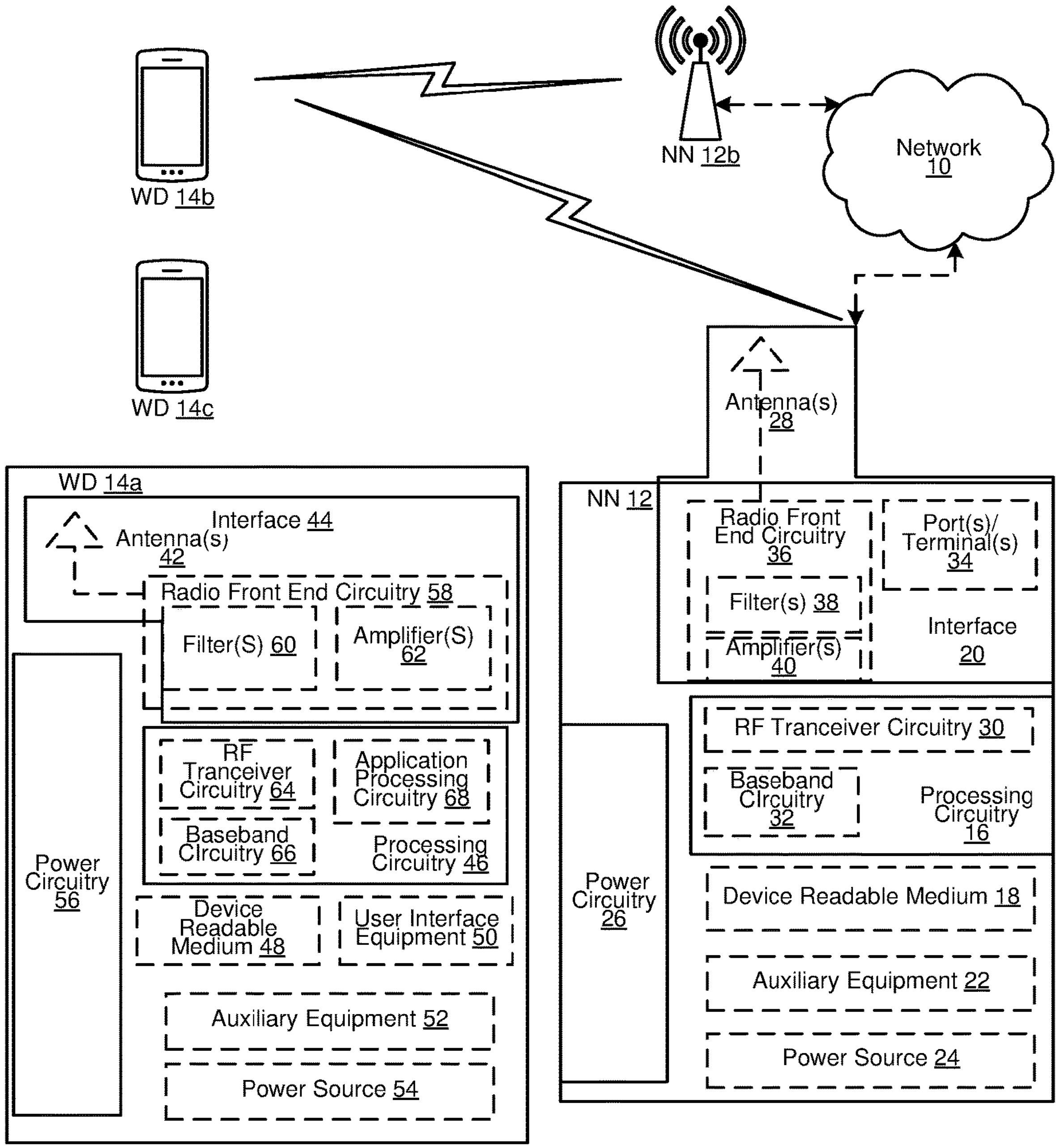
FIG. 3 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 10, network nodes (NNs) 12 and 12*b*, and WDs 14, 14*b*, and 14*c*. In practice, a wireless network may further include any additional elements suitable to support communication between wireless devices or between a wireless device and another communication device, such as a landline telephone, a service provider, or any other network node (NN) or end device. Of the illustrated components, network node 12 and wireless device (WD) 14 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 10 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 12 and WD 14 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 12 includes processing circuitry 16, device readable medium 18, interface 20, auxiliary equipment 22, power source 24, power circuitry 26, and antenna 28. Although network node 12 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 12 are depicted as single boxes located within a larger box, or nested within multiple boxes, in practice, a network node may comprise multiple different physical components that make up a single illustrated component (e.g., device readable medium 18 may comprise multiple separate hard drives as well as multiple RAM modules).

Similarly, network node 12 may be composed of multiple physically separate components (e.g., a NodeB component and a RNC component, or a BTS component and a BSC component, etc.), which may each have their own respective components. In certain scenarios in which network node 12 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 12 may be configured to support multiple radio access technologies (RATs). In such embodiments, some components may be duplicated (e.g., separate device readable medium 18 for the different RATs) and some components may be reused (e.g., the same antenna 28 may be shared by the RATs). Network node 12 may also include multiple sets of the various illustrated components for different wireless technologies integrated into network node 12, such as, for example, GSM, WCDMA, LTE, NR, WiFi, or Bluetooth wireless technologies. These wireless technologies may be integrated into the same or different chip or set of chips and other components within network node 12.

Processing circuitry 16 is configured to perform any determining, calculating, or similar operations (e.g., certain obtaining operations) described herein as being provided by a network node. These operations performed by processing circuitry 16 may include processing information obtained by processing circuitry 16 by, for example, converting the obtained information into other information, comparing the obtained information or converted information to information stored in the network node, and/or performing one or more operations based on the obtained information or converted information, and as a result of said processing making a determination.

Processing circuitry 16 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 12 components, such as device readable medium 18, network node 12 functionality. For example, processing circuitry 16 may execute instructions stored in device readable medium 18 or in memory within processing circuitry 16. Such functionality may include providing any of the various wireless features, functions, or benefits discussed herein. In some embodiments, processing circuitry 16 may include a system on a chip (SOC).

In some embodiments, processing circuitry 16 may include one or more of radio frequency (RF) transceiver circuitry 30 and baseband processing circuitry 32. In some embodiments, radio frequency (RF) transceiver circuitry 30 and baseband processing circuitry 32 may be on separate chips (or sets of chips), boards, or units, such as radio units and digital units. In alternative embodiments, part or all of RF transceiver circuitry 30 and baseband processing circuitry 32 may be on the same chip or set of chips, boards, or units In certain embodiments, some or all of the functionality described herein as being provided by a network node, base station, eNB or other such network device may be performed by processing circuitry 16 executing instructions stored on device readable medium 18 or memory within processing circuitry 16. In alternative embodiments, some or all of the functionality may be provided by processing circuitry 16 without executing instructions stored on a separate or discrete device readable medium, such as in a hard-wired manner. In any of those embodiments, whether executing instructions stored on a device readable storage medium or not, processing circuitry 16 can be configured to perform the described functionality. The benefits provided by such functionality are not limited to processing circuitry 16 alone or to other components of network node 12, but are enjoyed by network node 12 as a whole, and/or by end users and the wireless network generally.

Device readable medium 18 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 16. Device readable medium 18 may store any suitable instructions, data or information, including a computer program, software, an application including one or more of logic, rules, code, tables, etc. and/or other instructions capable of being executed by processing circuitry 16 and, utilized by network node 12. Device readable medium 18 may be used to store any calculations made by processing circuitry 16 and/or any data received via interface 20. In some embodiments, processing circuitry 16 and device readable medium 18 may be considered to be integrated.

Interface 20 is used in the wired or wireless communication of signalling and/or data between network node 12, network 10, and/or WDs 14. As illustrated, interface 20 comprises port(s)/terminal(s) 34 to send and receive data, for example to and from network 10 over a wired connection. Interface 20 also includes radio front end circuitry 36 that may be coupled to, or in certain embodiments a part of, antenna 28. Radio front end circuitry 36 comprises filters 38 and amplifiers 40. Radio front end circuitry 36 may be connected to antenna 28 and processing circuitry 16. Radio front end circuitry may be configured to condition signals communicated between antenna 28 and processing circuitry 16. Radio front end circuitry 36 may receive digital data that is to be sent out to other network nodes or WDs via a wireless connection. Radio front end circuitry 36 may convert the digital data into a radio signal having the appropriate channel and bandwidth parameters using a combination of filters 38 and/or amplifiers 40. The radio signal may then be transmitted via antenna 28. Similarly, when receiving data, antenna 28 may collect radio signals which are then converted into digital data by radio front end circuitry 36. The digital data may be passed to processing circuitry 16. In other embodiments, the interface may comprise different components and/or different combinations of components.

In certain alternative embodiments, network node 12 may not include separate radio front end circuitry 36, instead, processing circuitry 16 may comprise radio front end circuitry and may be connected to antenna 28 without separate radio front end circuitry 36. Similarly, in some embodiments, all or some of RF transceiver circuitry 30 may be considered a part of interface 20. In still other embodiments, interface 20 may include one or more ports or terminals 34, radio front end circuitry 36, and RF transceiver circuitry 30, as part of a radio unit (not shown), and interface 20 may communicate with baseband processing circuitry 32, which is part of a digital unit (not shown).

Antenna 28 may include one or more antennas, or antenna arrays, configured to send and/or receive wireless signals. Antenna 28 may be coupled to radio front end circuitry 36 and may be any type of antenna capable of transmitting and receiving data and/or signals wirelessly. In some embodiments, antenna 28 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 28 may be separate from network node 12 and may be connectable to network node 12 through an interface or port.

Antenna 28, interface 20, and/or processing circuitry 16 may be configured to perform any receiving operations and/or certain obtaining operations described herein as being performed by a network node. Any information, data and/or signals may be received from a wireless device, another network node and/or any other network equipment. Similarly, antenna 28, interface 20, and/or processing circuitry 16 may be configured to perform any transmitting operations described herein as being performed by a network node. Any information, data and/or signals may be transmitted to a wireless device, another network node and/or any other network equipment.

Power circuitry 26 may comprise, or be coupled to, power management circuitry and is configured to supply the components of network node 12 with power for performing the functionality described herein. Power circuitry 26 may receive power from power source 24. Power source 24 and/or power circuitry 26 may be configured to provide power to the various components of network node 12 in a form suitable for the respective components (e.g., at a voltage and current level needed for each respective component). Power source 24 may either be included in, or external to, power circuitry 26 and/or network node 12. For example, network node 12 may be connectable to an external power source (e.g., an electricity outlet) via an input circuitry or interface such as an electrical cable, whereby the external power source supplies power to power circuitry 26. As a further example, power source 24 may comprise a source of power in the form of a battery or battery pack which is connected to, or integrated in, power circuitry 26. The battery may provide backup power should the external power source fail. Other types of power sources, such as photovoltaic devices, may also be used.

Alternative embodiments of network node 12 may include additional components beyond those shown in FIG. 3 that may be responsible for providing certain aspects of the network node's functionality, including any of the functionality described herein and/or any functionality necessary to support the subject matter described herein. For example, network node 12 may include user interface equipment to allow input of information into network node 12 and to allow output of information from network node 12. This may allow a user to perform diagnostic, maintenance, repair, and other administrative functions for network node 12.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a WD implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 14 includes antenna 42, interface 44, processing circuitry 46, device readable medium 48, user interface equipment 50, auxiliary equipment 52, power source 54 and power circuitry 56. WD 14 may include multiple sets of one or more of the illustrated components for different wireless technologies supported by WD 14, such as, for example, GSM, WCDMA, LTE, NR, WiFi, WiMAX, or Bluetooth wireless technologies, just to mention a few. These wireless technologies may be integrated into the same or different chips or set of chips as other components within WD 14.

Antenna 42 may include one or more antennas or antenna arrays, configured to send and/or receive wireless signals, and is connected to interface 44. In certain alternative embodiments, antenna 42 may be separate from WD 14 and be connectable to WD 14 through an interface or port. Antenna 42, interface 44, and/or processing circuitry 46 may be configured to perform any receiving or transmitting operations described herein as being performed by a WD. Any information, data and/or signals may be received from a network node and/or another WD. In some embodiments, radio front end circuitry and/or antenna 42 may be considered an interface.

As illustrated, interface 44 comprises radio front end circuitry 58 and antenna 42. Radio front end circuitry 58 comprise one or more filters 60 and amplifiers 62. Radio front end circuitry 58 is connected to antenna 42 and processing circuitry 46, and is configured to condition signals communicated between antenna 42 and processing circuitry 46. Radio front end circuitry 58 may be coupled to or a part of antenna 42. In some embodiments, WD 14 may not include separate radio front end circuitry 58; rather, processing circuitry 46 may comprise radio front end circuitry and may be connected to antenna 42. Similarly, in some embodiments, some or all of RF transceiver circuitry 64 may be considered a part of interface 44. Radio front end circuitry 58 may receive digital data that is to be sent out to other network nodes or WDs via a wireless connection. Radio front end circuitry 58 may convert the digital data into a radio signal having the appropriate channel and bandwidth parameters using a combination of filters 60 and/or amplifiers 62. The radio signal may then be transmitted via antenna 42. Similarly, when receiving data, antenna 42 may collect radio signals which are then converted into digital data by radio front end circuitry 58. The digital data may be passed to processing circuitry 46. In other embodiments, the interface may comprise different components and/or different combinations of components.

Processing circuitry 46 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 14 components, such as device readable medium 48, WD 14 functionality. Such functionality may include providing any of the various wireless features or benefits discussed herein. For example, processing circuitry 46 may execute instructions stored in device readable medium 48 or in memory within processing circuitry 46 to provide the functionality disclosed herein.

As illustrated, processing circuitry 46 includes one or more of RF transceiver circuitry 64, baseband processing circuitry 66, and application processing circuitry 68. In other embodiments, the processing circuitry may comprise different components and/or different combinations of components. In certain embodiments processing circuitry 46 of WD 14 may comprise a SOC. In some embodiments, RF transceiver circuitry 64, baseband processing circuitry 66, and application processing circuitry 68 may be on separate chips or sets of chips. In alternative embodiments, part or all of baseband processing circuitry 66 and application processing circuitry 68 may be combined into one chip or set of chips, and RF transceiver circuitry 64 may be on a separate chip or set of chips. In still alternative embodiments, part or all of RF transceiver circuitry 64 and baseband processing circuitry 66 may be on the same chip or set of chips, and application processing circuitry 68 may be on a separate chip or set of chips. In yet other alternative embodiments, part or all of RF transceiver circuitry 64, baseband processing circuitry 66, and application processing circuitry 68 may be combined in the same chip or set of chips. In some embodiments, RF transceiver circuitry 64 may be a part of interface 44. RF transceiver circuitry 64 may condition RF signals for processing circuitry 46.

In certain embodiments, some or all of the functionality described herein as being performed by a WD may be provided by processing circuitry 46 executing instructions stored on device readable medium 48, which in certain embodiments may be a computer-readable storage medium. In alternative embodiments, some or all of the functionality may be provided by processing circuitry 46 without executing instructions stored on a separate or discrete device readable storage medium, such as in a hard-wired manner. In any of those particular embodiments, whether executing instructions stored on a device readable storage medium or not, processing circuitry 46 can be configured to perform the described functionality. The benefits provided by such functionality are not limited to processing circuitry 46 alone or to other components of WD 14, but are enjoyed by WD 14 as a whole, and/or by end users and the wireless network generally.

Processing circuitry 46 may be configured to perform any determining, calculating, or similar operations (e.g., certain obtaining operations) described herein as being performed by a WD. These operations, as performed by processing circuitry 46, may include processing information obtained by processing circuitry 46 by, for example, converting the obtained information into other information, comparing the obtained information or converted information to information stored by WD 14, and/or performing one or more operations based on the obtained information or converted information, and as a result of said processing making a determination.

Device readable medium 48 may be operable to store a computer program, software, an application including one or more of logic, rules, code, tables, etc. and/or other instructions capable of being executed by processing circuitry 46. Device readable medium 48 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 46. In some embodiments, processing circuitry 46 and device readable medium 48 may be considered to be integrated.

User interface equipment 50 may provide components that allow for a human user to interact with WD 14. Such interaction may be of many forms, such as visual, audial, tactile, etc. User interface equipment 50 may be operable to produce output to the user and to allow the user to provide input to WD 14. The type of interaction may vary depending on the type of user interface equipment 50 installed in WD 14. For example, if WD 14 is a smart phone, the interaction may be via a touch screen; if WD 14 is a smart meter, the interaction may be through a screen that provides usage (e.g., the number of gallons used) or a speaker that provides an audible alert (e.g., if smoke is detected). User interface equipment 50 may include input interfaces, devices and circuits, and output interfaces, devices and circuits. User interface equipment 50 is configured to allow input of information into WD 14, and is connected to processing circuitry 46 to allow processing circuitry 46 to process the input information. User interface equipment 50 may include, for example, a microphone, a proximity or other sensor, keys/buttons, a touch display, one or more cameras, a USB port, or other input circuitry. User interface equipment 50 is also configured to allow output of information from WD 14, and to allow processing circuitry 46 to output information from WD 14. User interface equipment 50 may include, for example, a speaker, a display, vibrating circuitry, a USB port, a headphone interface, or other output circuitry. Using one or more input and output interfaces, devices, and circuits, of user interface equipment 50, WD 14 may communicate with end users and/or the wireless network, and allow them to benefit from the functionality described herein.

Auxiliary equipment 52 is operable to provide more specific functionality which may not be generally performed by WDs. This may comprise specialized sensors for doing measurements for various purposes, interfaces for additional types of communication such as wired communications etc. The inclusion and type of components of auxiliary equipment 52 may vary depending on the embodiment and/or scenario.

Power source 54 may, in some embodiments, be in the form of a battery or battery pack. Other types of power sources, such as an external power source (e.g., an electricity outlet), photovoltaic devices or power cells, may also be used. WD 14 may further comprise power circuitry 56 for delivering power from power source 54 to the various parts of WD 14 which need power from power source 54 to carry out any functionality described or indicated herein. Power circuitry 56 may in certain embodiments comprise power management circuitry. Power circuitry 56 may additionally or alternatively be operable to receive power from an external power source; in which case WD 14 may be connectable to the external power source (such as an electricity outlet) via input circuitry or an interface such as an electrical power cable. Power circuitry 56 may also in certain embodiments be operable to deliver power from an external power source to power source 54. This may be, for example, for the charging of power source 54. Power circuitry 56 may perform any formatting, converting, or other modification to the power from power source 54 to make the power suitable for the respective components of WD 14 to which power is supplied.

Figure 4:
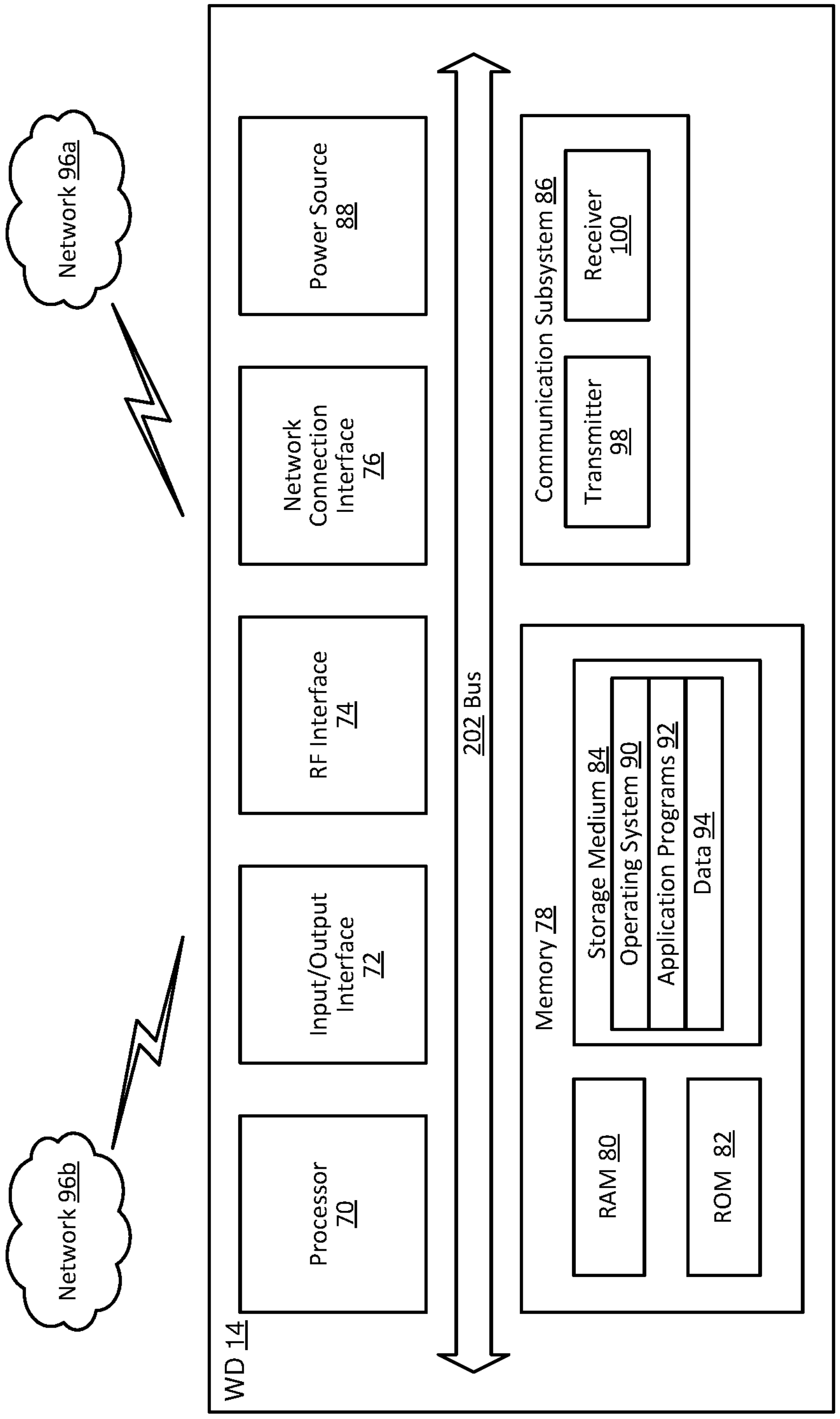
FIG. 4 illustrates a wireless device in accordance with some embodiments.

FIG. 4 illustrates one embodiment of a WD 14 in accordance with various aspects described herein. As used herein, a user equipment or WD 14 may not necessarily have a user in the sense of a human user who owns and/or operates the relevant device. Instead, a WD 14 may represent a device that is intended for sale to, or operation by, a human user but which may not, or which may not initially, be associated with a specific human user (e.g., a smart sprinkler controller). Alternatively, a WD 14 may represent a device that is not intended for sale to, or operation by, an end user but which may be associated with or operated for the benefit of a user (e.g., a smart power meter). WD 14 may be any WD identified by the 3rd Generation Partnership Project (3GPP), including a NB-IoT WD, a machine type communication (MTC) WD, and/or an enhanced MTC (eMTC) WD. WD 14, as illustrated in FIG. 4, is one example of a WD 14 configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 4 is a WD 14, the components discussed herein are equally applicable to a UE, and vice-versa.

In FIG. 4, WD 14 includes processing circuitry 70 that is operatively coupled to input/output interface 72, radio frequency (RF) interface 74, network connection interface 76, memory 78 including random access memory (RAM) 80, read-only memory (ROM) 82, and storage medium 84 or the like, communication subsystem 86, power source 88, and/or any other component, or any combination thereof. Storage medium 84 includes operating system 90, application program 92, and data 94. In other embodiments, storage medium 84 may include other similar types of information. Certain WDs may utilize all of the components shown in FIG. 4, or only a subset of the components. The level of integration between the components may vary from one WD to another WD. Further, certain WDs may contain multiple instances of a component, such as multiple processors, memories, transceivers, transmitters, receivers, etc.

In FIG. 4, processing circuitry 70 may be configured to process computer instructions and data. Processing circuitry 70 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 70 may include two central processing units (CPUs). Data may be information in a form suitable for use by a computer.

In the depicted embodiment, input/output interface 72 may be configured to provide a communication interface to an input device, output device, or input and output device. WD 14 may be configured to use an output device via input/output interface 72. An output device may use the same type of interface port as an input device. For example, a USB port may be used to provide input to and output from WD 14. The output device may be a speaker, a sound card, a video card, a display, a monitor, a printer, an actuator, an emitter, a smartcard, another output device, or any combination thereof. WD 14 may be configured to use an input device via input/output interface 72 to allow a user to capture information into WD 14. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 74 may be configured to provide a communication interface to RF components such as a transmitter, a receiver, and an antenna. Network connection interface 76 may be configured to provide a communication interface to network **96*a*. Network 96*a* may encompass wired and/or wireless networks such as a local-area network (LAN), a wide-area network (WAN), a computer network, a wireless network, a telecommunications network, another like network or any combination thereof. For example, network 96*a* may comprise a Wi-Fi network. Network connection interface 76 may be configured to include a receiver and a transmitter interface used to communicate with one or more other devices over a communication network according to one or more communication protocols, such as Ethernet, TCP/IP, SONET, ATM, or the like. Network connection interface 76** may implement receiver and transmitter functionality appropriate to the communication network links (e.g., optical, electrical, and the like). The transmitter and receiver functions may share circuit components, software or firmware, or alternatively may be implemented separately.

RAM 80 may be configured to interface via bus 202 to processing circuitry 70 to provide storage or caching of data or computer instructions during the execution of software programs such as the operating system, application programs, and device drivers. ROM 82 may be configured to provide computer instructions or data to processing circuitry 70. For example, ROM 82 may be configured to store invariant low-level system code or data for basic system functions such as basic input and output (I/O), startup, or reception of keystrokes from a keyboard that are stored in a non-volatile memory. Storage medium 84 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 84 may be configured to include operating system 90, application program 92 such as a web browser application, a widget or gadget engine or another application, and data file 94. Storage medium 84 may store, for use by WD 14, any of a variety of various operating systems or combinations of operating systems.

Storage medium 84 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 84 may allow WD 14 to access computer-executable instructions, application programs or the like, stored on transitory or non-transitory memory media, to off-load data, or to upload data. An article of manufacture, such as one utilizing a communication system may be tangibly embodied in storage medium 84, which may comprise a device readable medium.

In FIG. 4, processing circuitry 70 may be configured to communicate with network **96*b* using communication subsystem 86. Network 96*a* and network 96*b* may be the same network or networks or different network or networks. Communication subsystem 86 may be configured to include one or more transceivers used to communicate with network 96*b*. For example, communication subsystem 86 may be configured to include one or more transceivers used to communicate with one or more remote transceivers of another device capable of wireless communication such as another WD/UE, or base station of a radio access network (RAN) according to one or more communication protocols, such as IEEE 802.11, CDMA, WCDMA, GSM, LTE, UTRAN, WiMax, or the like. Each transceiver may include transmitter 98 and/or receiver 100 to implement transmitter or receiver functionality, respectively, appropriate to the RAN links (e.g., frequency allocations and the like). Further, transmitter 98 and receiver 100** of each transceiver may share circuit components, software or firmware, or alternatively may be implemented separately.

In the illustrated embodiment, the communication functions of communication subsystem 86 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 86 may include cellular communication, Wi-Fi communication, Bluetooth communication, and GPS communication. Network **96*b* may encompass wired and/or wireless networks such as a local-area network (LAN), a wide-area network (WAN), a computer network, a wireless network, a telecommunications network, another like network or any combination thereof. For example, network 96*b* may be a cellular network, a Wi-Fi network, and/or a near-field network. Power source QQ213 may be configured to provide alternating current (AC) or direct current (DC) power to components of WD 14**.

The features, benefits and/or functions described herein may be implemented in one of the components of WD 14 or partitioned across multiple components of WD 14. Further, the features, benefits, and/or functions described herein may be implemented in any combination of hardware, software or firmware. In one example, communication subsystem 86 may be configured to include any of the components described herein. Further, processing circuitry 70 may be configured to communicate with any of such components over bus 202. In another example, any of such components may be represented by program instructions stored in memory that when executed by processing circuitry 70 perform the corresponding functions described herein. In another example, the functionality of any of such components may be partitioned between processing circuitry 70 and communication subsystem 86. In another example, the non-computationally intensive functions of any of such components may be implemented in software or firmware and the computationally intensive functions may be implemented in hardware.

Figure 5:
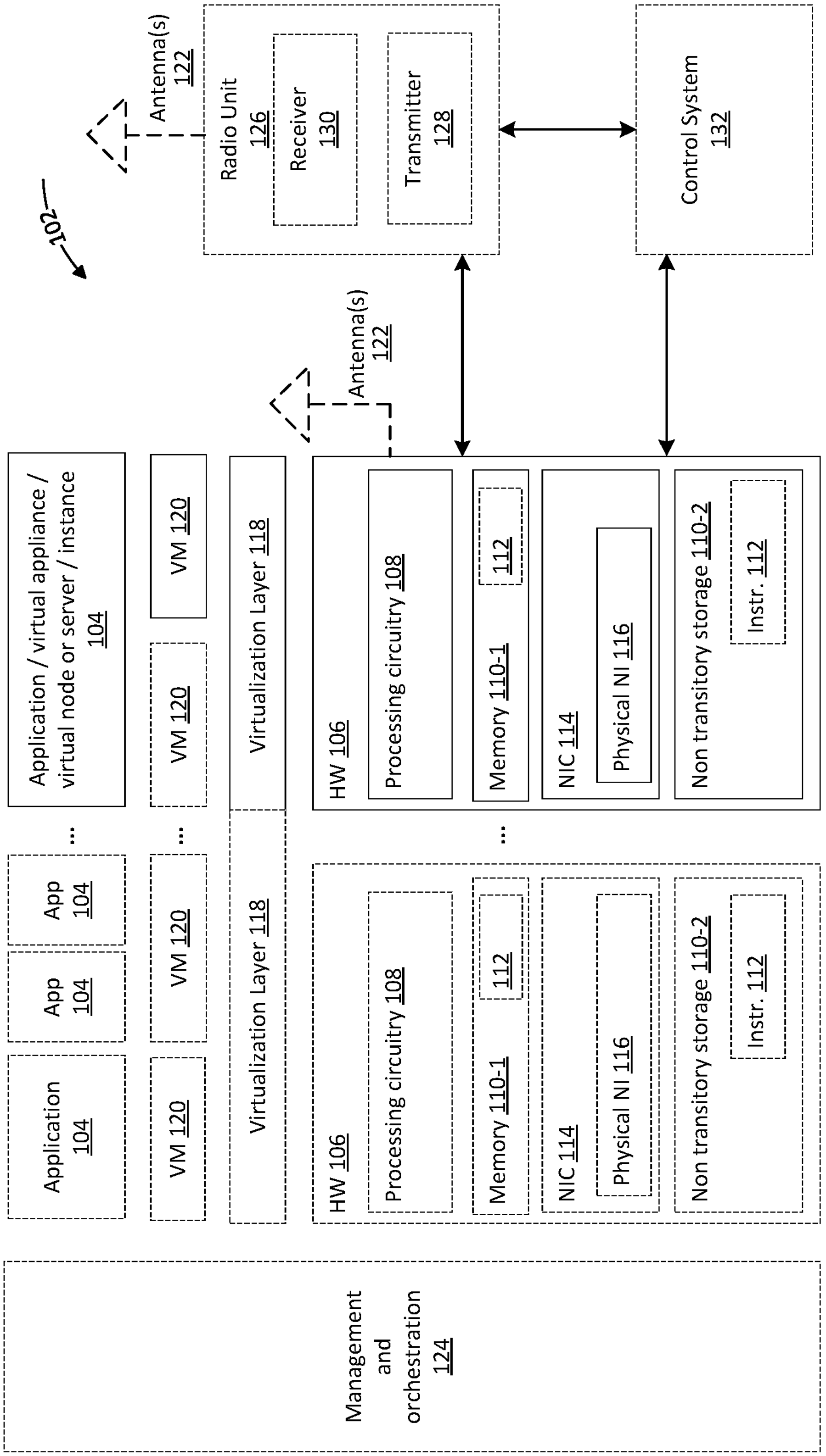
FIG. 5 illustrates a virtualization environment in accordance with some embodiments.

FIG. 5 is a schematic block diagram illustrating a virtualization environment 102 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a WD, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 102 hosted by one or more of hardware nodes 106. Further, in embodiments in which the virtual node is not a radio access node or does not require radio connectivity (e.g., a core network node), then the network node may be entirely virtualized.

The functions may be implemented by one or more applications 104 (which may alternatively be called software instances, virtual appliances, network functions, virtual nodes, virtual network functions, etc.) operative to implement some of the features, functions, and/or benefits of some of the embodiments disclosed herein. Applications 104 are run in virtualization environment 102 which provides hardware 106 comprising processing circuitry 108 and memory 110. Memory 110 contains instructions, e.g., software 112, executable by processing circuitry 108 whereby application 104 is operative to provide one or more of the features, benefits, and/or functions disclosed herein.

Virtualization environment 102, comprises general-purpose or special-purpose network hardware devices 106 comprising a set of one or more processors or processing circuitry 108, which may be commercial off-the-shelf (COTS) processors, dedicated Application Specific Integrated Circuits (ASICs), or any other type of processing circuitry including digital or analog hardware components or special purpose processors. Each hardware device may comprise memory 110-1 which may be non-persistent memory for temporarily storing instructions or software 112 executed by processing circuitry 108. Each hardware device may comprise one or more network interface controllers (NICs) 114, also known as network interface cards, which include physical network interface 116. Each hardware device may also include non-transitory, persistent, machine-readable storage media 110-2 having stored therein software 112 and/or instructions executable by processing circuitry 108. Software 112 may include any type of software including software for instantiating one or more virtualization layers 118 (also referred to as hypervisors), software to execute virtual machines 120 as well as software allowing it to execute functions, features and/or benefits described in relation with some embodiments described herein.

Virtual machines 120, comprise virtual processing, virtual memory, virtual networking or interface and virtual storage, and may be run by a corresponding virtualization layer 118 or hypervisor. Different embodiments of the instance of virtual applicant 104 may be implemented on one or more of virtual machines 120, and the implementations may be made in different ways.

During operation, processing circuitry 108 executes software 112 to instantiate the hypervisor or virtualization layer 118, which may sometimes be referred to as a virtual machine monitor (VMM). Virtualization layer 118 may present a virtual operating platform that appears like networking hardware to virtual machine 120.

As shown in FIG. 5, hardware 106 may be a standalone network node with generic or specific components. Hardware 106 may comprise antenna 122 and may implement some functions via virtualization. Alternatively, hardware 106 may be part of a larger cluster of hardware (e.g., such as in a data center or customer premise equipment (CPE)) where many hardware nodes work together and are managed via management and orchestration (MANO) 124, which, among others, oversees lifecycle management of applications 104.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 120 may be a software implementation of a physical machine that runs programs as if they were executing on a physical, non-virtualized machine. Each of virtual machines 120, and that part of hardware 106 that executes that virtual machine, be it hardware dedicated to that virtual machine and/or hardware shared by that virtual machine with others of the virtual machines 120, forms a separate virtual network elements (VNE).

Still in the context of NFV, Virtual Network Function (VNF) is responsible for handling specific network functions that run in one or more virtual machines 120 on top of hardware networking infrastructure 106 and corresponds to application 104 in FIG. 5.

In some embodiments, one or more radio units 126 that each include one or more transmitters 128 and one or more receivers 130 may be coupled to one or more antennas 122. Radio units 126 may communicate directly with hardware nodes 106 via one or more appropriate network interfaces and may be used in combination with the virtual components to provide a virtual node with radio capabilities, such as a radio access node or a base station.

In some embodiments, some signalling can be effected with the use of control system 132 which may alternatively be used for communication between the hardware nodes 106 and radio units 126.

Figure 6:
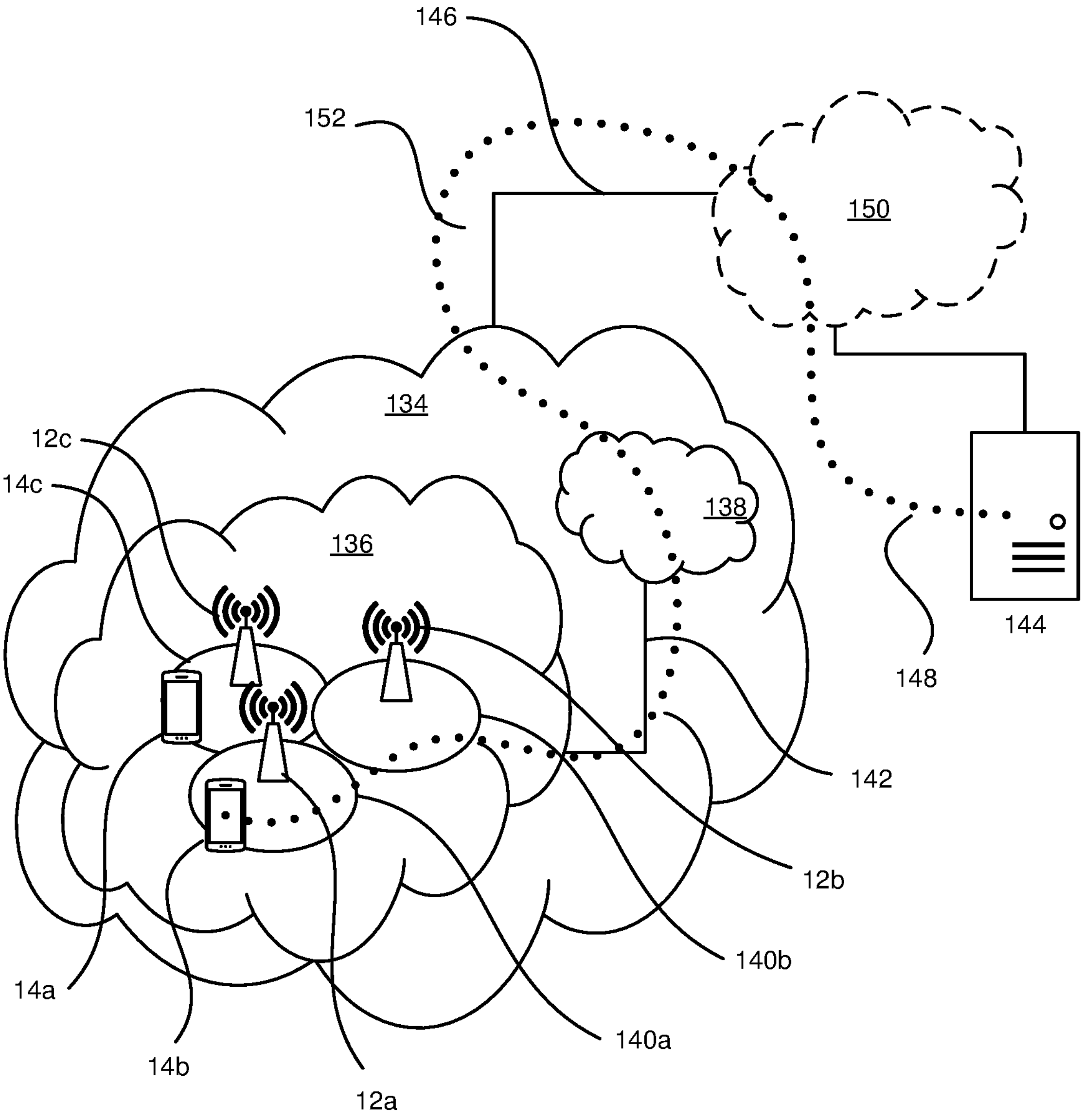
FIG. 6 illustrates a telecommunication network connected via an intermediate network to host a computer in accordance with some embodiments.

With reference to FIG. 6, in accordance with an embodiment, a communication system includes telecommunication network 134, such as a 3GPP-type cellular network, which comprises access network 136, such as a radio access network, and core network 138. Access network 136 comprises a plurality of network nodes 12*a*, 12*b*, 12*c*, such as NBs, eNBs, gNBs or other types of wireless access points, each defining a corresponding coverage area 140*a*, 140*b*, 140*c*. Each network node 12*a*, 12*b*, 12*c* is connectable to core network 138 over a wired or wireless connection 142. A first WD 14*a* located in coverage area 140*c* is configured to wirelessly connect to, or be paged by, the corresponding network node 12*c*. A second WD 14*b* in coverage area 140*a* is wirelessly connectable to the corresponding network node 12*a*. While a plurality of WDs 14*a*, 14*b* are illustrated in this example, the disclosed embodiments are equally applicable to a situation where a sole WD is in the coverage area or where a sole WD is connecting to the corresponding network node 12.

Telecommunication network 134 is itself connected to host computer 144, which may be embodied in the hardware and/or software of a standalone server, a cloud-implemented server, a distributed server or as processing resources in a server farm. Host computer 144 may be under the ownership or control of a service provider, or may be operated by the service provider or on behalf of the service provider. Connections 146 and 148 between telecommunication network 134 and host computer 144 may extend directly from core network 138 to host computer 144 or may go via an optional intermediate network 150. Intermediate network 150 may be one of, or a combination of more than one of, a public, private or hosted network; intermediate network 150, if any, may be a backbone network or the Internet; in particular, intermediate network 150 may comprise two or more sub-networks (not shown).

The communication system of FIG. 6 as a whole enables connectivity between the connected WDs 14*a*, 14*b* and host computer 144. The connectivity may be described as an over-the-top (OTT) connection 152. Host computer 144 and the connected WDs 14*a*, 14*b* are configured to communicate data and/or signaling via OTT connection 152, using access network 136, core network 138, any intermediate network 150 and possible further infrastructure (not shown) as intermediaries. OTT connection 152 may be transparent in the sense that the participating communication devices through which OTT connection 152 passes are unaware of routing of uplink and downlink communications. For example, network node 12 may not or need not be informed about the past routing of an incoming downlink communication with data originating from host computer 144 to be forwarded (e.g., handed over) to a connected WD 14*a*. Similarly, network node 12 need not be aware of the future routing of an outgoing uplink communication originating from the WD 14*a* towards the host computer 144.

Example implementations, in accordance with an embodiment, of the WD, network node and host computer discussed in the preceding paragraphs will now be described with reference to FIG. 7. In communication system 154, host computer 144 comprises hardware 156 including communication interface 158 configured to set up and maintain a wired or wireless connection with an interface of a different communication device of communication system 154. Host computer 144 further comprises processing circuitry 160, which may have storage and/or processing capabilities. In particular, processing circuitry 160 may comprise one or more programmable processors, application-specific integrated circuits, field programmable gate arrays or combinations of these (not shown) adapted to execute instructions. Host computer 144 further comprises software 162, which is stored in or accessible by host computer 144 and executable by processing circuitry 160. Software 162 includes host application 164. Host application 164 may be operable to provide a service to a remote user, such as WD 14 connecting via OTT connection 166 terminating at WD 14 and host computer 144. In providing the service to the remote user, host application 164 may provide user data which is transmitted using OTT connection 166.

Communication system 154 further includes network node 12 provided in a telecommunication system and comprising hardware 168 enabling it to communicate with host computer 144 and with WD 14. Hardware 168 may include communication interface 170 for setting up and maintaining a wired or wireless connection with an interface of a different communication device of communication system 154, as well as radio interface 172 for setting up and maintaining at least wireless connection 174 with WD 14 located in a coverage area (not shown in FIG. 7) served by network node 12. Communication interface 170 may be configured to facilitate connection 176 to host computer 144. Connection 176 may be direct or it may pass through a core network (not shown in FIG. 7) of the telecommunication system and/or through one or more intermediate networks outside the telecommunication system. In the embodiment shown, hardware 168 of network node 12 further includes processing circuitry 178, which may comprise one or more programmable processors, application-specific integrated circuits, field programmable gate arrays or combinations of these (not shown) adapted to execute instructions. Network node 12 further has software 180 stored internally or accessible via an external connection.

Communication system 154 further includes WD 14 already referred to. Its hardware 182 may include radio interface 184 configured to set up and maintain wireless connection 174 with a network node serving a coverage area in which WD 14 is currently located. Hardware 182 of WD 14 further includes processing circuitry 186, which may comprise one or more programmable processors, application-specific integrated circuits, field programmable gate arrays or combinations of these (not shown) adapted to execute instructions. WD 14 further comprises software 188, which is stored in or accessible by WD 14 and executable by processing circuitry 186. Software 188 includes client application 190. Client application 190 may be operable to provide a service to a human or non-human user via WD 14, with the support of host computer 144. In host computer 144, an executing host application 164 may communicate with the executing client application 190 via OTT connection 166 terminating at WD 14 and host computer 144. In providing the service to the user, client application 190 may receive request data from host application 164 and provide user data in response to the request data. OTT connection 166 may transfer both the request data and the user data. Client application 190 may interact with the user to generate the user data that it provides.

Figure 7:
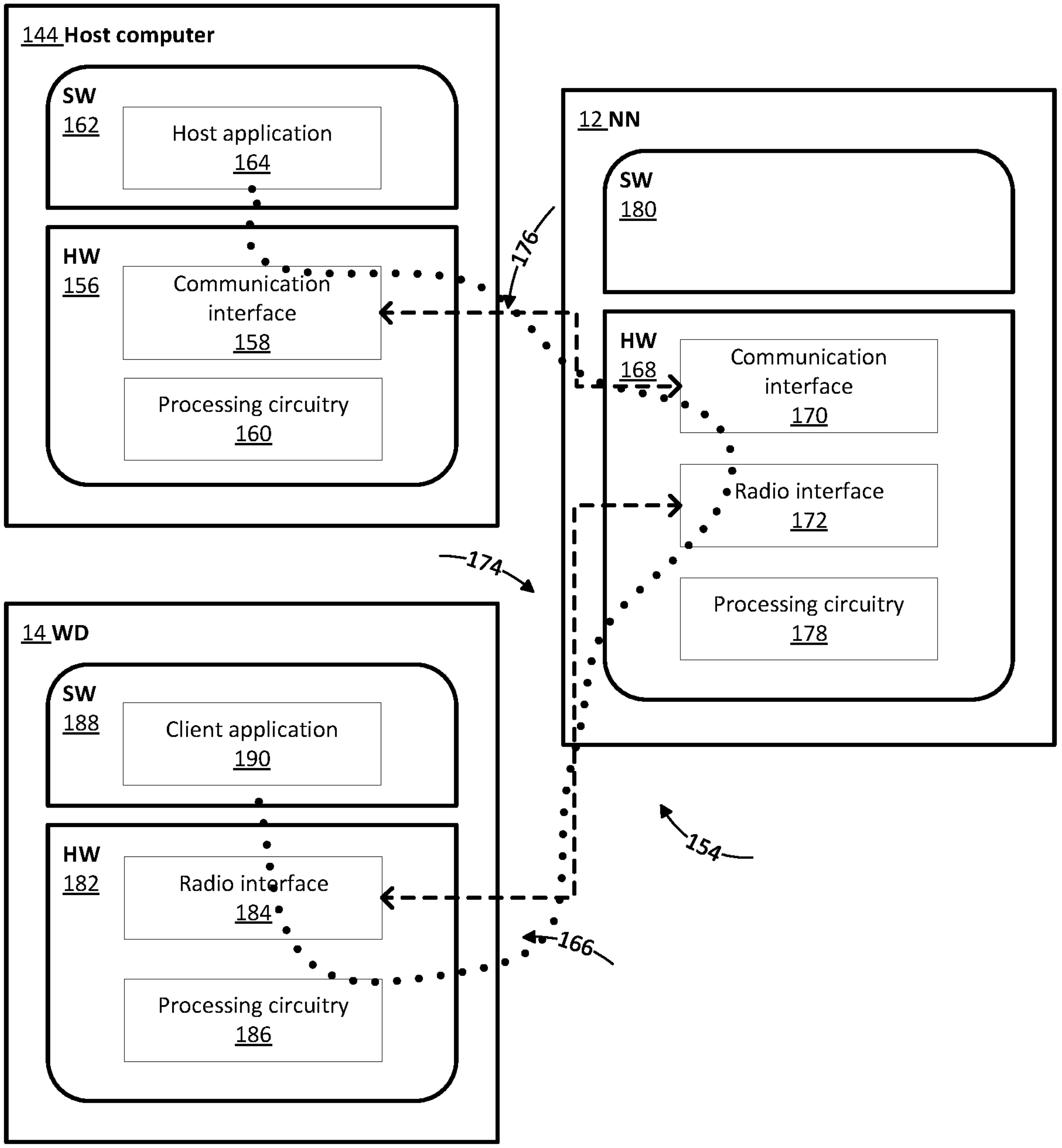
FIG. 7 illustrates a host computer communicating via a base station with a wireless device over a partially wireless connection in accordance with some embodiments.

It is noted that host computer 144, network node 12 and WD 14 illustrated in FIG. 7 may be similar or identical to host computer 144, one of network nodes 12*a*, 12*b*, 12*c* and one of WDs 14, 14*b* of FIG. 6, respectively. This is to say, the inner workings of these entities may be as shown in FIG. 7 and independently, the surrounding network topology may be that of FIG. 6.

In FIG. 7, OTT connection 166 has been drawn abstractly to illustrate the communication between host computer 144 and WD 14 via network node 12, without explicit reference to any intermediary devices and the precise routing of messages via these devices. Network infrastructure may determine the routing, which it may be configured to hide from WD 14 or from the service provider operating host computer 144, or both. While OTT connection 166 is active, the network infrastructure may further take decisions by which it dynamically changes the routing (e.g., on the basis of load balancing consideration or reconfiguration of the network).

Wireless connection 174 between WD 14 and network node 12 is in accordance with the teachings of the embodiments described throughout this disclosure. One or more of the various embodiments improve the performance of OTT services provided to WD 14 using OTT connection 166, in which wireless connection 174 forms the last segment. More precisely, the teachings of these embodiments may improve the latency/activation delay, reducing overhead, improving Network Key Performance Indicators (KPI) and WD Quality of Service (QoS) and thereby provide benefits such as an efficient way of system adaptation by changing a full RRC profile associated with a BWP without RRC signaling.

A measurement procedure may be provided for the purpose of monitoring data rate, latency and other factors on which the one or more embodiments improve. There may further be an optional network functionality for reconfiguring OTT connection 166 between host computer 144 and WD 14, in response to variations in the measurement results. The measurement procedure and/or the network functionality for reconfiguring OTT connection 166 may be implemented in software 162 and hardware 156 of host computer 144 or in software 180 and hardware 182 of WD 14, or both. In embodiments, sensors (not shown) may be deployed in or in association with communication devices through which OTT connection 166 passes; the sensors may participate in the measurement procedure by supplying values of the monitored quantities exemplified above, or supplying values of other physical quantities from which software 180, 188 may compute or estimate the monitored quantities. The reconfiguring of OTT connection 166 may include message format, retransmission settings, preferred routing etc.; the reconfiguring need not affect network node 12, and it may be unknown or imperceptible to network node 12. Such procedures and functionalities may be known and practiced in the art. In certain embodiments, measurements may involve proprietary WD signaling facilitating host computer 144's measurements of throughput, propagation times, latency and the like. The measurements may be implemented in that software 162 and processing circuitry 186 causes messages to be transmitted, in particular empty or 'dummy' messages, using OTT connection 166 while it monitors propagation times, errors etc.

Figure 8:
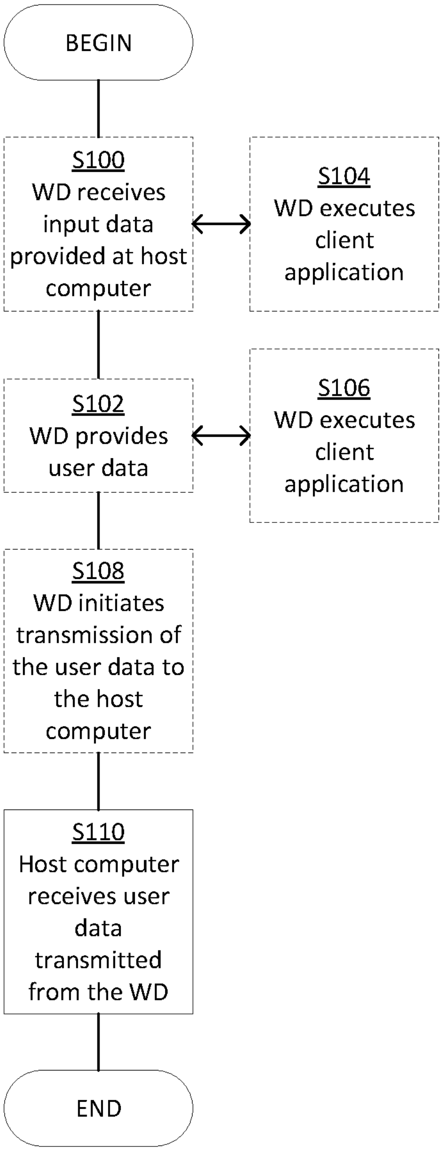
FIG. 8 illustrates example methods implemented in a communication system including a host computer, a base station and a wireless device in accordance with some embodiments.

FIG. 8 is a flowchart illustrating a method implemented in a communication system, in accordance with one embodiment. The communication system includes a host computer 144, a network node 12 and a WD 14 which may be those described with reference to FIGS. 6 and 7. For simplicity of the present disclosure, only drawing references to FIG. 8 will be included in this section. In step S100 (which may be optional), the WD 14 receives input data provided by the host computer 144. Additionally or alternatively, in step S102, the WD 14 provides user data. In substep S104 (which may be optional) of step S100, the WD 14 provides the user data by executing a client application 190. In substep S106 (which may be optional) of step S102, the WD 14 executes a client application 190 which provides the user data in reaction to the received input data provided by the host computer 144. In providing the user data, the executed client application 190 may further consider user input received from the user. Regardless of the specific manner in which the user data was provided, the WD 14 initiates, in substep S108 (which may be optional), transmission of the user data to the host computer 144. In step S110 of the method, the host computer 144 receives the user data transmitted from the WD 14, in accordance with the teachings of the embodiments described throughout this disclosure.

Figure 9:
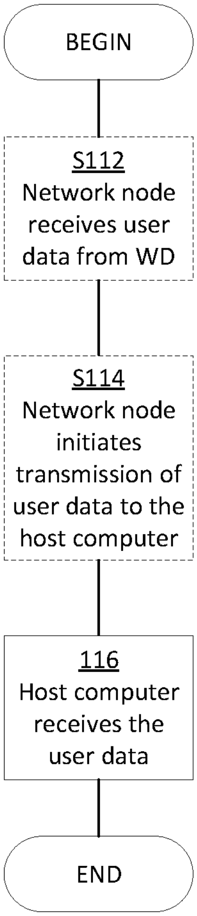
FIG. 9 illustrates example methods implemented in a communication system including a host computer, a base station and a wireless device in accordance with some embodiments.

FIG. 9 is a flowchart illustrating a method implemented in a communication system, in accordance with one embodiment. The communication system includes a host computer 144, a network node 12 and a WD 14 which may be those described with reference to FIGS. 6 and 7. For simplicity of the present disclosure, only drawing references to FIG. 9 will be included in this section. In step S112 (which may be optional), in accordance with the teachings of the embodiments described throughout this disclosure, the network node 12 receives user data from the WD 14. In step S114 (which may be optional), the network node 12 initiates transmission of the received user data to the host computer 144. In step S116 (which may be optional), the host computer 144 receives the user data carried in the transmission initiated by the network node 12.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 10:
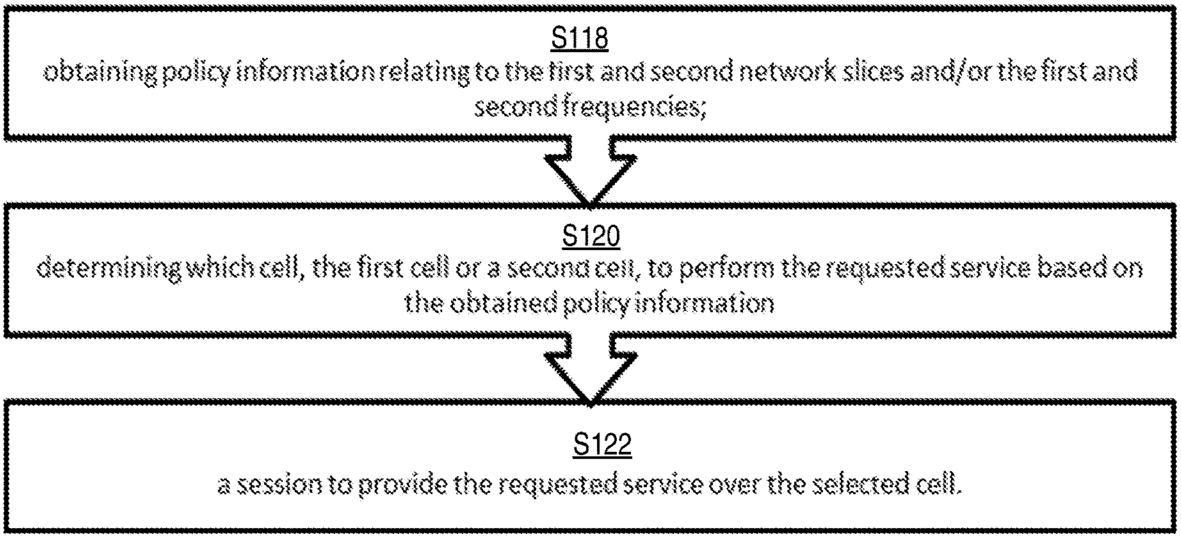
FIG. 10 illustrates an example method in accordance with some embodiments.

FIG. 10 depicts a method in accordance with particular embodiments. The method is performed by a wireless device for cell selection to access a network slice on a different frequency than a user equipment (UE) is currently served by. Initially, a UE is connected to a first cell where the first cell servicing a first network slice which operates in a first frequency, and wherein the UE sends a service request to be performed over a second network slice which operates in a second frequency. The method begins at step S118, the method first obtains policy information relating to the first and second network slices and/or the first and second frequencies. At step S120, it is determined which cell, the first cell or the second cell will perform the requested service based on the obtained policy information. At step S122, the service is provided over the selected cell.

Figure 11:
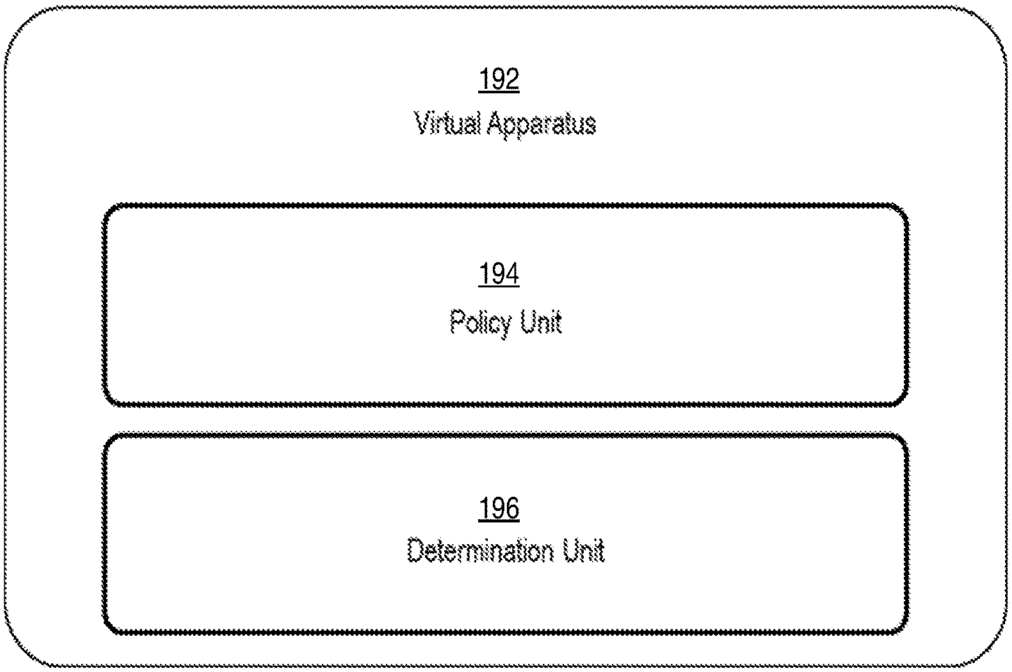
FIG. 11 illustrates an example virtual apparatus in accordance with some embodiments.

FIG. 11 illustrates a schematic block diagram of an apparatus 192 in a wireless network (for example, the wireless network shown in FIG. 6). The apparatus may be implemented in a wireless device or network node (e.g., wireless device 14 or network node 12 shown in FIG. 6). Apparatus 192 is operable to carry out the example method described with reference to FIG. 10 and possibly any other processes or methods disclosed herein. It is also to be understood that the method of FIG. 10 is not necessarily carried out solely by apparatus 192. At least some operations of the method can be performed by one or more other entities.

Virtual Apparatus 192 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause policy unit 194 and determination unit 196, and any other suitable units of apparatus 192 to perform corresponding functions according one or more embodiments of the present disclosure.

As illustrated in FIG. 11, apparatus 192 includes policy unit 194 and determination unit 196, and policy unit 194 and determination unit 196 are configured to obtain policy information relating to the first and second network slices and/or the first and second frequencies and determine which cell, the first cell or a second cell, to perform the requested service based on the obtained policy information.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 12:
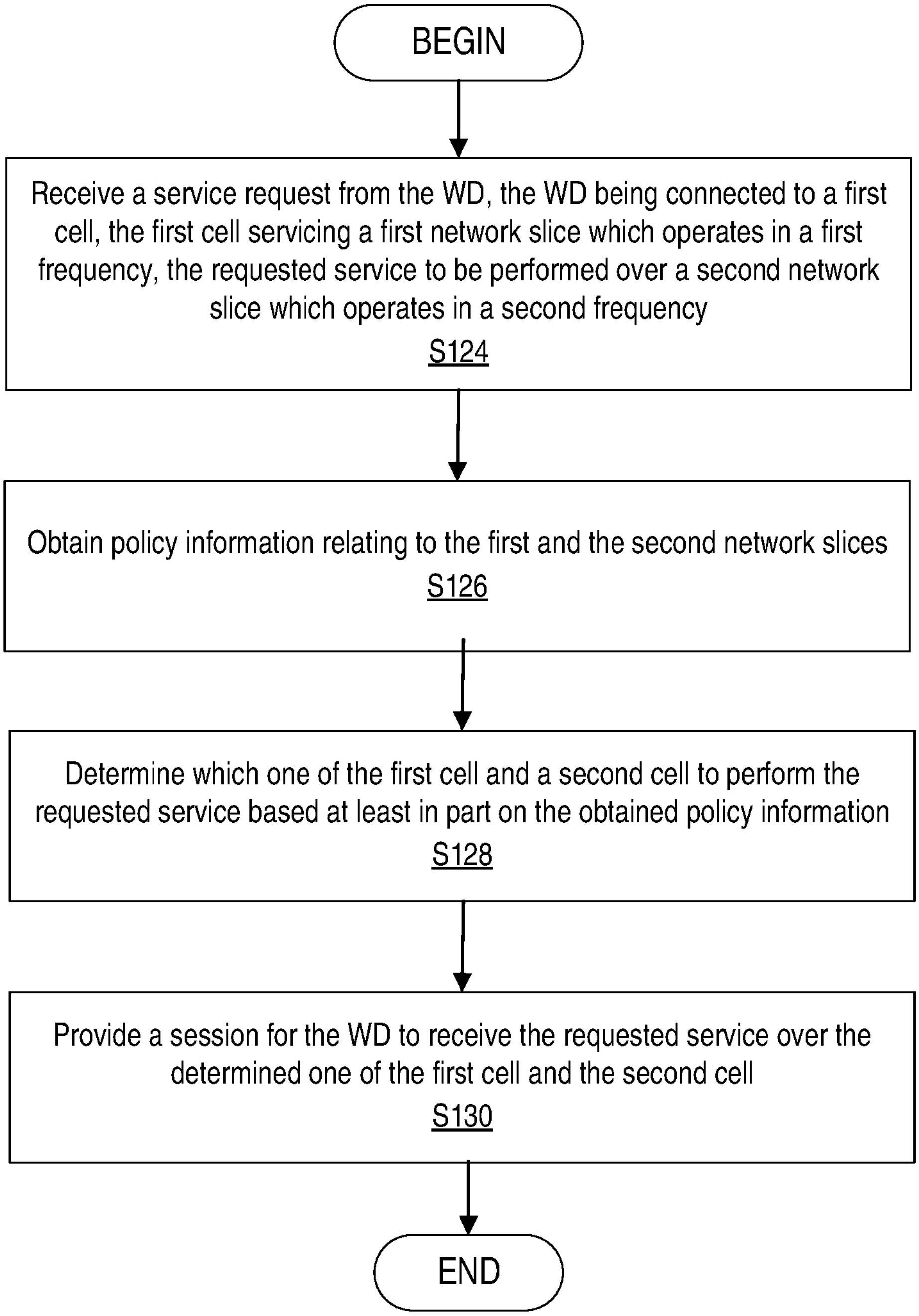
FIG. 12 is a flowchart of an example method for a network node according to one embodiment of the present disclosure.

FIG. 12 is a flowchart of an example process in a network node 12 (RAN) according to some embodiments of the present disclosure. One or more Blocks and/or functions and/or methods performed by the network node 12 may be performed by one or more elements of network node 12 such as by processing circuitry 16, memory such as readable medium 18, interface 20, processing circuitry 178, communication interface 170, etc. or any other hardware in a network node 12 according to the example method. The example method includes receiving (Block S124), such as by processing circuitry 16, memory such as readable medium 18, interface 20, processing circuitry 178, communication interface 170, etc., a service request from the WD, the WD being connected to a first cell, the first cell servicing a first network slice which operates in a first frequency, the requested service to be performed over a second network slice which operates in a second frequency. Network node 12, such as via processing circuitry 16, memory such as readable medium 18, interface 20, processing circuitry 178 and/or communication interface 170, is configured to obtain (Block S126) policy information relating to the first and the second network slices. Network node 12, such as via processing circuitry 16, memory such as readable medium 18, interface 20, processing circuitry 178 and/or communication interface 170, is configured to determine (Block S128) which one of the first cell and a second cell to perform the requested service based at least in part on the obtained policy information. Network node 12, such as via processing circuitry 16, memory such as readable medium 18, interface 20, processing circuitry 178 and/or communication interface 170, is configured to provide (Block S130) a session for the WD to receive the requested service over the determined one of the first cell and the second cell.

In some embodiments, network node 12, such as via processing circuitry 16, memory such as readable medium 18, interface 20, processing circuitry 178 and/or communication interface 170, is configured to determine which one of the first cell and the second cell to perform the requested service based at least in part on frequency information related to the first and second network slices, the obtained policy information being based at least in part on the frequency information. In some embodiments, the frequency information indicates at least one of: a. whether the second frequency is required for the second network slice; b. whether the second frequency for the second network slice is a preference; and c. whether the WD is not to be moved from the first cell to the second cell.

In some embodiments, the frequency information indicates at least one of: a. whether the second frequency is required for an activated user plane, UP, in the second network slice; b. whether the second frequency for the activated UP in the second network slice is a preference; and c. whether the WD is not to be moved from the first cell to the second cell. In some embodiments, network node 12, such as via processing circuitry 16, memory such as readable medium 18, interface 20, processing circuitry 178 and/or communication interface 170, is configured to determine which one of the first cell and the second cell to perform the requested service by being configured to: when the policy information indicates that the second frequency is required for the second network slice, determine to initiate an inter-frequency cell change of the WD from the first cell operating on the first frequency to the second cell operating on the second frequency, the second cell servicing the second network slice and the second cell being in a location of the WD.

In some embodiments, network node 12, such as via processing circuitry 16, memory such as readable medium 18, interface 20, processing circuitry 178 and/or communication interface 170, is configured to determine which one of the first cell and the second cell to perform the requested service by being configured to: when the policy information indicates that the frequency for the second network slice is the preference, determine to at least one of: establish the session to perform the requested service on the first cell; and initiate an inter-frequency cell change of the WD from the first cell operating on the first frequency to the second cell operating on the second frequency, the second cell being preferred over the first cell for servicing the second network slice and the second cell being in a location of the WD.

In some embodiments, network node 12, such as via processing circuitry 16, memory such as readable medium 18, interface 20, processing circuitry 178 and/or communication interface 170, is configured to determine which one of the first cell and the second cell to perform the requested service by being configured to: when the policy information indicates that the WD is not to be moved from the first cell to the second cell, determine to utilize the first cell to perform the requested service over the second frequency by: adopting a user plane, UP, configuration to serve the second network slice; and establishing the session on the first cell, the first cell servicing the second network slice in the second frequency according to the adopted UP configuration.

In some embodiments, the first and second network slices are indicated in an allowed network slice selection assistance information, NSSAI, as allowed for the WD. In some embodiments, the policy information related to the first and second network slices is comprised in a radio access technology frequency selection policy, RFSP, from a policy control function, PCF. In some embodiments, the session is a protocol data unit, PDU, session.

Figure 13:
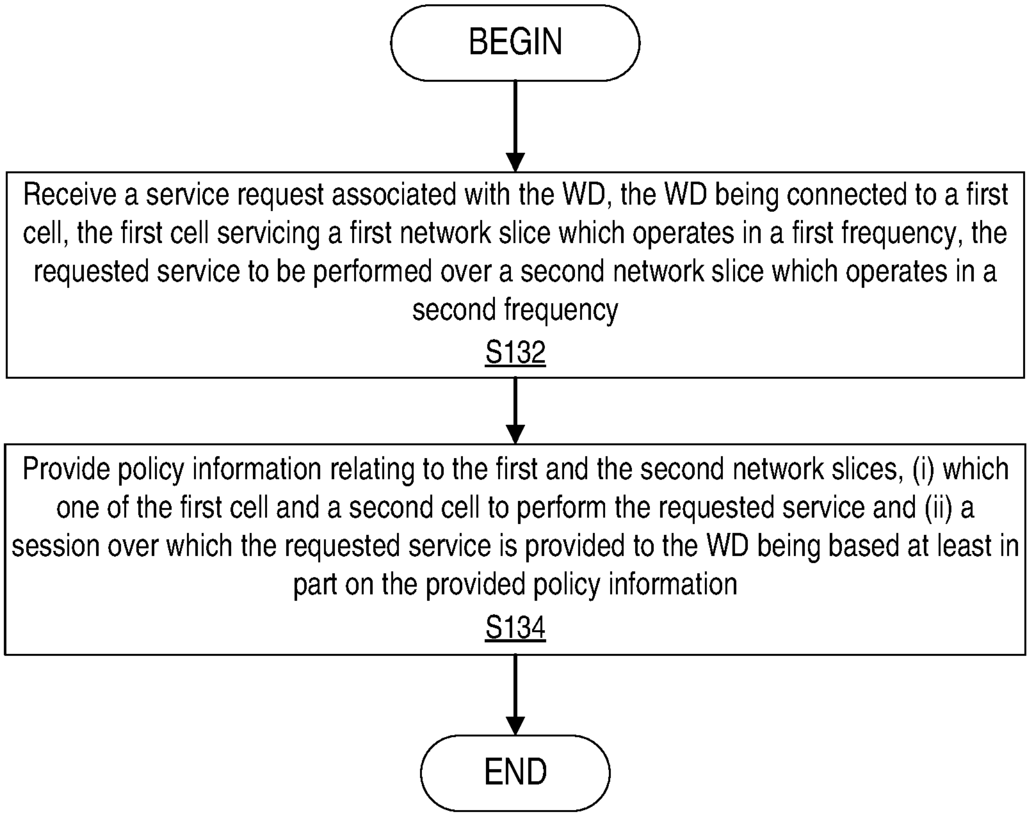
FIG. 13 is a flowchart of an example method for a wireless device according to one embodiment of the present disclosure.

FIG. 13 is a flowchart of an example process in a network node 12 (core network node, such as AMF) according to some embodiments of the present disclosure. One or more Blocks and/or functions and/or methods performed by the network node 12 may be performed by one or more elements of network node 12 such as by processing circuitry 16, memory such as readable medium 18, interface 20, processing circuitry 178, communication interface 170, etc. or any other hardware in a network node 12 according to the example method. The example method includes receiving (Block S132), such as by processing circuitry 16, memory such as readable medium 18, interface 20, processing circuitry 178, communication interface 170, etc., a service request associated with the WD, the WD being connected to a first cell, the first cell servicing a first network slice which operates in a first frequency, the requested service to be performed over a second network slice which operates in a second frequency. In some embodiments, network node 12, such as via processing circuitry 16, memory such as readable medium 18, interface 20, processing circuitry 178 and/or communication interface 170, is configured to provide (Block S134) policy information relating to the first and the second network slices, (i) which one of the first cell and a second cell to perform the requested service and (ii) a session over which the requested service is provided to the WD being based at least in part on the provided policy information.

In some embodiments, the one of the first cell and the second cell to perform the requested service is based at least in part on frequency information related to the first and second network slices, the provided policy information being based at least in part on the frequency information. In some embodiments, the frequency information indicates at least one of: a. whether the second frequency is required for the second network slice; b. whether the second frequency for the second network slice is a preference; and c. whether the WD is not to be moved from the first cell to the second cell. In some embodiments, the frequency information indicates at least one of: a. whether the second frequency is required for an activated user plane, UP, in the second network slice; b. whether the second frequency for the activated UP in the second network slice is a preference; and c. whether the WD is not to be moved from the first cell to the second cell.

In some embodiments, when the policy information indicates that the second frequency is required for the second network slice, an inter-frequency cell change of the WD from the first cell operating on the first frequency to the second cell operating on the second frequency is initiated, the second cell servicing the second network slice and the second cell being in a location of the WD. In some embodiments, when the policy information indicates that the frequency for the second network slice is the preference, at least one of: the session is established to perform the requested service on the first cell; and an inter-frequency cell change of the WD is initiated from the first cell operating on the first frequency to the second cell operating on the second frequency, the second cell being preferred over the first cell for servicing the second network slice and the second cell being in a location of the WD.

In some embodiments, network node 12, such as via processing circuitry 16, memory such as readable medium 18, interface 20, processing circuitry 178 and/or communication interface 170, is configured to when the policy information indicates that the WD is not to be moved from the first cell to the second cell, the first cell is utilized to perform the requested service over the second frequency by: adoption of a user plane, UP, configuration at the first cell to serve the second network slice; and establishment of the session on the first cell, the first cell servicing the second network slice in the second frequency according to the adopted UP configuration. In some embodiments, the first and second network slices are indicated in an allowed network slice selection assistance information, NSSAI, as allowed for the WD. In some embodiments, the policy information related to the first and second network slices is comprised in a radio access technology frequency selection policy, RESP, from a policy control function, PCF. In some embodiments, network node 12, such as via processing circuitry 16, memory such as readable medium 18, interface 20, processing circuitry 178 and/or communication interface 170, is configured to update the policy information to indicate activation of a user plane, UP, in the second network slice.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Below some embodiments are described. The example below may be considered to be based on a scenario captured in 3GPP Technical Report (TR) 23.700-40, with changes to illustrate some embodiments proposed in the present disclosure.

Figure 14:
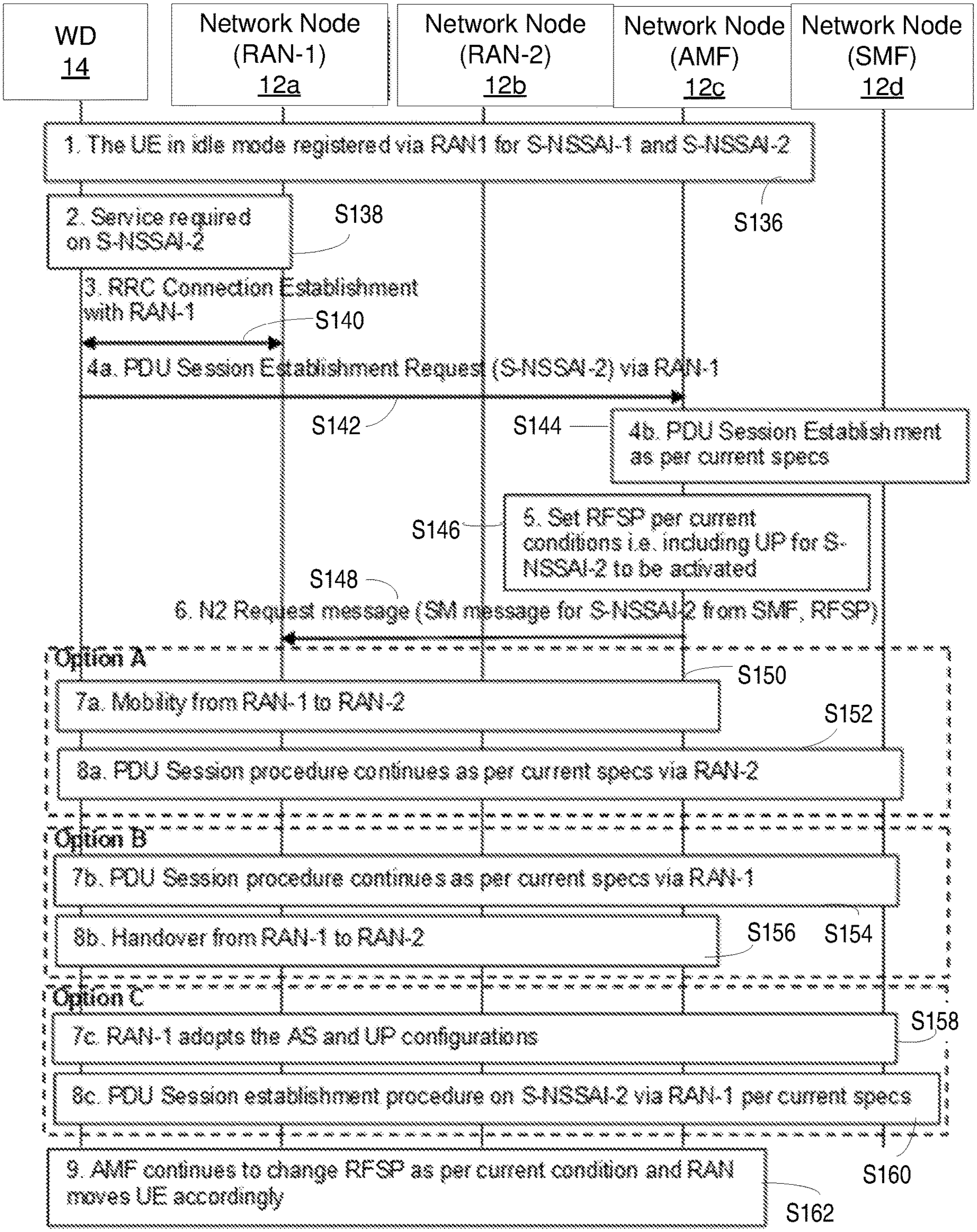
FIG. 14 is a call flow diagram illustrating an example steering of a UE to a network slice in a different FB according to some embodiments of the present disclosure.

FIG. 14 illustrates an example of steering the WD 14 to a network slice in a FB, e.g., a different FB than the FB the WD 14 is currently operating in.

1) S136: The WD 14 is in idle mode, registered via network node 12*a* (RAN-1) for S-NSSAI-1, which operates only in frequency band 1 (FB-1) and S-NSSAI-2, which operates only in frequency band 2 (FB-2).

2) S138: An application in the WD 14 is to establish service on S-NSSAI-2. S-NSSAI-2 is defined in the network to use FB-2 or FB-2 is preferred for S-NSSAI-2.

3) S140: The WD 14 establishes a radio resource control (RRC) connection with RAN-1.

4) S142 and S144: The WD 14 triggers PDU Session Establishment Request on S-NSSAI-2 via RAN-1.

5) S146: Network node 12*c* (AMF) is aware that RAN-1, via which the WD 14 is connected, does not serve the user plane (UP) of S-NSSAI-2 and the AMF is aware that S-NSSAI-2 is served by another RAN node. Or, AMF is aware of the FB preferences for S-NSSAI-2 by the radio access technology frequency selection policy (RFSP) configuration for S-NSSAI-2.

NOTE: Not seen in the call flow, but the AMF gets the RFSP to be applied from the policy control function (PCF) (or the network node 12*c* (SMF) gets it from PCF and AMF gets it from SMF) such that RFSP sent to NG-RAN always reflects the current situation e.g., based on Allowed NSSAI when there is no UP activated for an S-NSSAI and an RESP reflecting the combination of UP activated for a set of S-NSSAIs.

6) S148: AMF requests RAN-1 to apply RFSP while activating the UP for S-NSSAI-2 and in this case it implies to steer the WD 14 to a RAN node serving, or best serving (namely which is preferred to serve the S-NSSAI), S-NSSAI-2.

The NG-RAN RAN-1 determines whether to perform option A, option B, or option C to e.g., provide the session/PDU session for the requested service. Generally, the session may be provided via a PDU session establishment request to initiate PDU session establishment procedure; or a service request if e.g., the WD 14 already has a PDU session but without an active UP.

Option A (e.g., used if the FB is required for the S-NSSAI-2):

7a) S150: RAN-1 indicates to AMF that the request failed due to mobility and triggers inter-frequency cell change to network node 12*b* (RAN-2) which serves S-NSSAI-2 and is in WD's 14 location (i.e., "WD location" or "in location of WD" meaning cell supported by RAN being located such that the cell can be used by the WD, e.g., not too much interference or other issues with bad coverage for the WD).

NOTE: The inter-frequency cell change in connected mode may also be considered e.g., Handover, Cell Change Order, RRC release with re-direction or RRC Connection reconfiguration.

8a) S152: AMF may re-transmit the N2 message in step S148 and the PDU Session establishment procedure continues on S-NSSAI-2 via RAN-2.

Option B (e.g., used if the FB for S-NSSAI-2 is a preference):

7b) S154: PDU Session establishment procedure on S-NSSAI-2 via RAN-1 as per current specifications.

8b) S156: RAN-1 triggers inter-frequency cell change to RAN-2 which is preferred for S-NSSAI-2, as per RFSP, and is in WD's 14 location.

Option C (e.g., used if WD 14 should not be moved, since there is already an ongoing PDU session on NSSAI-1).

7c) S158: NG-RAN RAN-1 adopts the access stratum (AS) and UP configurations to serve the new UP for S-NSSAI-2 e.g., dual connectivity/carrier aggregation (DC/CA).

8c) S160: PDU Session establishment procedure on S-NSSAI-2 via RAN-1 as per current specifications.

9) S162: After PDU session on S-NSSAI-2 is deactivated or released, the AMF updates the RFSP towards the NG-RAN and the NG-RAN steers the WD 14 accordingly.

Impacts on Services, Entities and Interfaces

Some embodiments of the present disclosure may provide one or more of the following impacts on existing services, entities and/or interfaces:

WD 14 may not be impacted in some embodiments as the WD 14 will be steered by NG-RAN as per current mechanisms.

AMF (and PCF) logic to keep RFSP updated as per the current situation e.g., which S-NSSAIs have UP activated, etc.

RAN logic to steer WD 14 based on RFSP input.

Some embodiments may include one or more of the following:

Group A Embodiments

1. A method performed by a wireless device for cell selection to access a network slice on a different frequency than a user equipment (UE) is currently served by, the method comprising:
   - receive a service request from the UE, the UE connected to a first cell, the first cell servicing a first network slice which operates in a first frequency, the requested service to be performed over a second network slice which operates in a second frequency;
   - obtaining policy information relating to the first and second network slices and/or the first and second frequencies;
   - determining which cell, the first cell or a second cell, to perform the requested service based on the obtained policy information; and
   - providing a session to provide the requested service over the selected cell.
2. The method of embodiment 1, wherein the determining of the policy information may include:
   a. the frequency is strictly defined/required for the second slice;
   b. the frequency for the second slice is a preference; and
   c. the UE should not be moved from the first cell to the second cell.
3. The method of embodiment 2, wherein when the determining of the policy information determines the frequency is strictly defined/required for the second slice initiates an inter-frequency cell change to the second cell which serves the second slice and is in UE's location.
4. The method of embodiments 2-3, wherein when the determining of the policy information determines the frequency for the second slice is a preference initiates an inter-frequency cell change to the second cell which is preferred for the second slice and is in UE's location.
5. The method of embodiments 2-4, wherein when the determining of the policy information determines the UE should not be moved from the first cell to the second cell results in the utilization of the first cell.

Group B Embodiments

6. A method performed by a base station for cell selection to access a network slice on a different frequency than a user equipment (UE) is currently served by, the method comprising:
   - receive a service request from the UE, the UE connected to a first cell, the first cell servicing a first network slice which operates in a first frequency, the requested service to be performed over a second network slice which operates in a second frequency;
   - obtaining policy information relating to the first and second network slices and/or the first and second frequencies;
   - determining which cell, the first cell or a second cell, to perform the requested service based on the obtained policy information; and
   - providing a session to provide the requested service over the selected cell.
7. The method of embodiment 6, wherein the determining of the policy information may include:
   a. the frequency is strictly defined/required for the second slice;
   b. the frequency for the second slice is a preference; and
   c. the UE should not be moved from the first cell to the second cell.
8. The method of embodiment 7, wherein when the determining of the policy information determines the frequency is strictly defined/required for the second slice initiates an inter-frequency cell change to the second cell which serves the second slice and is in UE's location.
9. The method of embodiments 7-8, wherein when the determining of the policy information determines the frequency for the second slice is a preference initiates an inter-frequency cell change to the second cell which is preferred for the second slice and is in UE's location.
10. The method of embodiments 7-9, wherein when the determining of the policy information determines the UE should not be moved from the first cell to the second cell results in the utilization of the first cell.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RFSP RAT Frequency Selection Policy
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
Secondary Synchronization Signal SSS
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method performed by a network node for cell selection to access a network slice on a different frequency than a frequency by which a wireless device, WD, is currently served, the method comprising:

receiving a service request from the WD that is connected to a first cell for an ongoing session, the first cell servicing a first network slice which operates in a first frequency;

in response to the service request being associated with a service to be performed over a second network slice which operates in a second frequency of a second cell, obtaining policy information relating to the first and the second network slices, the policy information indicating one of:

the second frequency is required to service the request;

the second frequency is preferred for serving the request; and the WD is not to be moved from the first cell to the second cell;

if the policy information indicates the WD is not to be moved from the first cell to the second cell:

adopting a User Plane, UP, configuration of the first cell to service the request associated with the second frequency; and establishing a session to perform the requested service on the first cell based on the adopted UP configuration.

2. The method of claim 1, further comprising determining which one of the first cell and a second cell to perform the requested service based at least in part on frequency information related to the first and second network slices, the obtained policy information being based at least in part on the frequency information.

3. The method of claim 2, wherein the frequency information indicates at least one of:

a. whether the second frequency is required for the second network slice;
b. whether the second frequency for the second network slice is a preference; and
c. whether the WD is not to be moved from the first cell to the second cell.

4. The method of claim 3, wherein the determining which one of the first cell and the second cell to perform the requested service comprises:

when the policy information indicates that the WD is not to be moved from the first cell to the second cell, determining to utilize the first cell to perform the requested service over the second frequency.

5. The method of claim 2, wherein the frequency information indicates at least one of:

a. whether the second frequency is required for an activated user plane, UP, in the second network slice;
b. whether the second frequency for the activated UP in the second network slice is a preference; and
c. whether the WD is not to be moved from the first cell to the second cell.

6. The method of claim 1, wherein the first and second network slices are indicated in an allowed network slice selection assistance information, NSSAI, as allowed for the WD.

7. The method of claim 1, wherein the policy information related to the first and second network slices is comprised in a radio access technology frequency selection policy, RFSP, from a policy control function, PCF.

8. The method of claim 1, wherein the session is a protocol data unit, PDU, session.

9. A network node for cell selection to access a network slice on a different frequency than a frequency by which a wireless device, WD, is currently served, the network node comprising processing circuitry, the processing circuitry configured to cause the network node to:

receive a service request from the WD that is connected to a first cell for an ongoing session, the first cell servicing a first network slice which operates in a first frequency;

in response to the service request being associated with a service to be performed over a second network slice which operates in a second frequency of a second cell, obtain policy information relating to the first and the second network slices, the policy information indicating one of:

the second frequency is required to service the request;

the second frequency is preferred for serving the request; and the WD is not to be moved from the first cell to the second cell;

if the policy information indicates the WD is not to be moved from the first cell to the second cell:

adopting a User Plane, UP, configuration of the first cell to service the request associated with the second frequency; and establish a session to perform the requested service on the first cell based on the adopted UP configuration.

10. The network node of claim 9, wherein the processing circuitry is configured to determine which one of the first cell and a second cell to perform the requested service based at least in part on frequency information related to the first and second network slices, the obtained policy information being based at least in part on the frequency information.

11. The network node of claim 10, wherein the frequency information indicates at least one of:

a. whether the second frequency is required for the second network slice;
b. whether the second frequency for the second network slice is a preference; and
c. whether the WD is not to be moved from the first cell to the second cell.

12. The network node of claim 11, wherein the processing circuitry is configured to determine which one of the first cell and the second cell to perform the requested service by being configured to:

when the policy information indicates that the WD is not to be moved from the first cell to the second cell, determine to utilize the first cell to perform the requested service over the second frequency.

13. The network node of claim 10, wherein the frequency information indicates at least one of:

a. whether the second frequency is required for an activated user plane, UP, in the second network slice;
b. whether the second frequency for the activated UP in the second network slice is a preference; and
c. whether the WD is not to be moved from the first cell to the second cell.

14. The network node of claim 9, wherein the first and second network slices are indicated in an allowed network slice selection assistance information, NSSAI, as allowed for the WD.

15. The network node of claim 9, wherein the policy information related to the first and second network slices is comprised in a radio access technology frequency selection policy, RFSP, from a policy control function, PCF.

16. The network node of claim 9, wherein the session is a protocol data unit, PDU, session and the service request is a PDU session establishment request.

* * * * *